(12) United States Patent
Sowadski et al.

(10) Patent No.: US 8,986,011 B1
(45) Date of Patent: Mar. 24, 2015

(54) OCCLUSION SERVER FOR AN INTEGRATED LIVE AND SIMULATION ENVIRONMENT FOR AN AIRCRAFT

(75) Inventors: Clifford B. Sowadski, Eureka, MO (US); Robert James Lechner, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 12/880,701

(22) Filed: Sep. 13, 2010

(51) Int. Cl.
*G09B 19/16* (2006.01)

(52) U.S. Cl.
USPC .............................................. 434/66; 434/29

(58) Field of Classification Search
USPC .................... 434/29–71; 701/448; 345/426
See application file for complete search history.

(56) References Cited

U.S. PATENT DOCUMENTS

| | | | |
|---|---|---|---|
| 4,442,491 A | 4/1984 | Olhausen, Jr. | |
| 4,599,070 A | 7/1986 | Hladky et al. | |
| 5,616,030 A | 4/1997 | Watson | |
| 5,807,109 A | 9/1998 | Tzidon et al. | |
| 7,098,913 B1 * | 8/2006 | Etherington et al. | 345/426 |
| 2003/0046396 A1 | 3/2003 | Richter | |
| 2006/0178758 A1 | 8/2006 | Koriat | |
| 2007/0264617 A1 | 11/2007 | Richardson et al. | |
| 2008/0206719 A1 * | 8/2008 | Johnsson et al. | 434/37 |
| 2010/0013927 A1 | 1/2010 | Nixon | |
| 2011/0171611 A1 | 7/2011 | Batcheller et al. | |
| 2011/0313658 A1 * | 12/2011 | He | 701/208 |
| 2012/0156653 A1 | 6/2012 | Wokurka | |
| 2012/0204059 A1 | 8/2012 | Preston | |

FOREIGN PATENT DOCUMENTS

| | | |
|---|---|---|
| JP | H08276074 | 10/1996 |
| WO | 2012082242 A2 | 6/2012 |

OTHER PUBLICATIONS

Lechner et al., "Integrated Live Constructive Technologies Applied to Tactical Aviation Training", Interservice/Industry Training, Simulation, and Education Conference (I/TSEC) 2008, pp. 1-11 http://www.iitsec.org/documents/8147_2008BPnomTrng_Paper.pdf.
U.S. Appl. No. 12/628,831 dated Dec. 1, 2009, pp. 62.
U.S. Appl. No. 13/304,514 dated Nov. 25, 2011, pp. 78.
U.S. Appl. No. 12/968,494 dated Dec. 15, 2010, pp. 88.
U.S. Appl. No. 12/628,831, filed Dec. 1, 2009, Mendro et al.
Final Office Action, dated Oct. 25, 2012, regarding U.S. Appl. No. 12/628,831, 11 pages.
Office Action, dated Aug. 30, 2012, regarding U.S. Appl. No. 13/304,504, 11 pages.

(Continued)

*Primary Examiner* — Timothy A Musselman
(74) *Attorney, Agent, or Firm* — Yee & Associates, P.C.

(57) ABSTRACT

A method and apparatus for generating visible objects not blocked by other objects in a simulation during training with aircraft. A position for each aircraft in a number of aircraft is identified for which objects that block the fields of view for each aircraft are to be identified to form a number of positions for the number of aircraft. Any object in the simulation that blocks a portion of a field of view for each aircraft at the position for each aircraft is identified to form a number of objects. Simulation data is created for a number of visible objects not blocked by the number of objects in the simulation that has been identified as blocking the portion of the field of view for each aircraft in the number of aircraft. The simulation data is sent to each aircraft in the number of aircraft.

21 Claims, 13 Drawing Sheets

(56) References Cited

OTHER PUBLICATIONS

Office Action, dated Aug. 31, 2012, regarding U.S. Appl. No. 12/968,494, 11 pages.
Office Action, dated Jun. 6, 2013, regarding U.S. Appl. No. 12/628,831, 9 pages.
Notice of Allowance, dated Aug. 23, 2013, regarding U.S. Appl. No. 13/304,514, 14 pages.
Notice of Allowance, dated Aug. 20, 2013, regarding U.S. Appl. No. 12/968,494, 22 pages.
International Search Report and Written Opinion, dated Aug. 12, 2013, regarding Application No. PCT/US2011/058527, 9 pages.
USPTO Final Office Action Dec. 21, 2012, for U.S. Appl. No. 13/304,514, 12 pages.
Office Action, dated Aug. 20, 2014, regarding U.S. Appl. No. 14/141,761, 15 pages.
Final Oficial Action, dated Jun. 19, 2014, regarding U.S. Appl. No. 14/141,761, 7 pages.
USPTO Office Action dated Apr. 5, 2012 regarding U.S. Appl. No. 12/628,831, 13 pages.

* cited by examiner

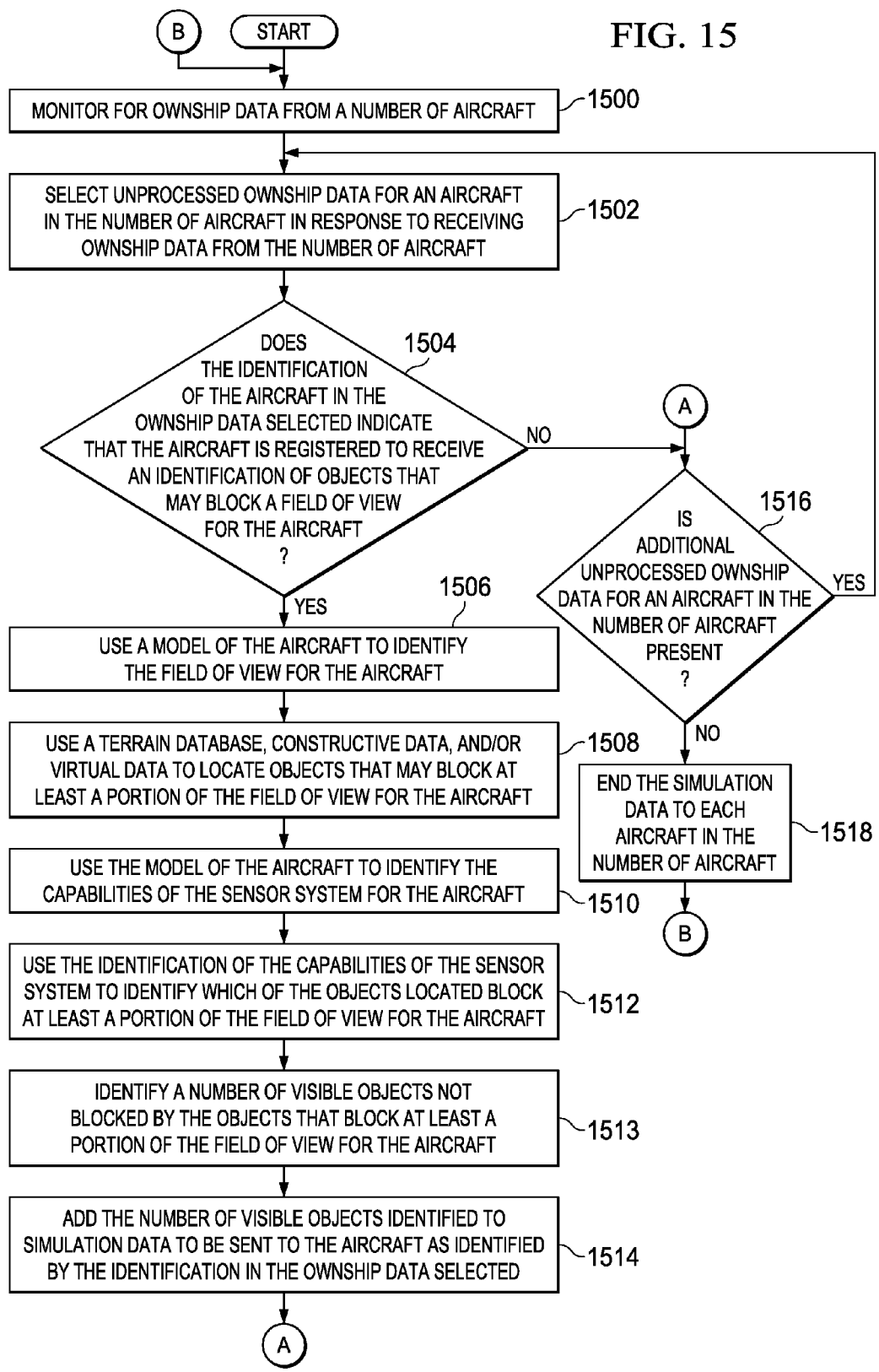

OCCLUSION SERVER FOR AN INTEGRATED LIVE AND SIMULATION ENVIRONMENT FOR AN AIRCRAFT

BACKGROUND INFORMATION

1. Field

The present disclosure relates generally to aircraft and, in particular, to a method and apparatus for performing training exercises in an aircraft. Still more particularly, the present disclosure relates to a method and apparatus for performing training exercises in an aircraft in which a live environment and a simulation environment are present.

2. Background

Training exercises are often performed for military aircraft. These training exercises are used to teach pilots how to operate the aircraft. Additionally, the exercises are also used to train the pilots on different strategies and tactics with respect to operating the aircraft. For example, pilots may train in an aircraft to improve skills and reactions to adversarial events. These events may include, for example, without limitation, encountering enemy aircraft, reacting to a presence of surface-to-air missile sites, engaging time sensitive targets, and other suitable events.

A large amount of training may be performed using training devices on the ground. These training devices often take the form of flight simulators. A flight simulator is a system that copies or simulates the experience of flying an aircraft. A flight simulator is meant to make the experience as real as possible. Flight simulators may range from controls and a display in a room to a full-size replica of a cockpit mounted on actuators that are configured to move the cockpit in response to actions taken by a pilot. These types of simulators provide a capability to teach pilots and/or other crew members to operate various aircraft systems and to react to different events.

Additional training is performed through training exercises using live aircraft. These types of training exercises expose pilots to the actual conditions encountered when flying an aircraft. Various conditions cannot be accurately simulated using a flight simulator. For example, the actual movement or forces encountered in flying an aircraft may not be adequately provided through a flight simulator.

With military aircraft, this type of training is typically performed on various areas or ranges. This type of training may involve using multiple live aircraft to perform training on encountering enemy aircraft. Further, various ground platforms also may be used. These ground platforms may include, for example, without limitation, tanks, surface-to-air missile systems, and other suitable ground units. These types of training exercises provide a pilot with the additional experience needed to operate an aircraft in different conditions.

Live training exercises are difficult and/or expensive to set up and operate. For example, to perform a training exercise in the air, airspace is restricted to other aircraft to avoid unintended incursions into the airspace in which the training occurs. Additionally, fuel, maintenance, and other expenses are required to prepare the aircraft for the exercises, operate the aircraft during the exercises, and perform maintenance after the exercises have concluded.

Further, the amount of airspace may be confining and may restrict the type and amount of movement that aircraft can make during a training exercise. Times and locations where airspace can be restricted may limit the amount of time when training exercises can be performed.

Therefore, it would be advantageous to have a method and apparatus that takes into account one or more of the issues discussed above, as well as possibly other issues.

SUMMARY

In one advantageous embodiment, an apparatus comprises a network interface configured to communicate with a number of aircraft and a computer system. The computer system is configured to identify a position for each aircraft in the number of aircraft for which objects that block fields of view are to be identified to form a number of positions for the number of aircraft. The computer system is configured to identify any object in a simulation that blocks a portion of a field of view for the each aircraft in the number of aircraft at the position for the each aircraft in the number of positions for the number of aircraft to form a number of objects. The computer system is configured to create simulation data for a number of visible objects in the simulation not blocked by the number of objects that has been identified as blocking the portion of the field of view for the each aircraft in the number of aircraft. The computer system is configured to send the simulation data to the each aircraft in the number of aircraft.

In another advantageous embodiment, a method is provided for generating visible objects not blocked by objects that block fields of view in a simulation during training with aircraft. A position for each aircraft in a number of aircraft is identified for which the objects that block the fields of view are to be identified to form a number of positions for the number of aircraft. Any object in the simulation that blocks a portion of a field of view for the each aircraft in the number of aircraft at the position for the each aircraft in the number of positions for the number of aircraft is identified to form a number of objects. Simulation data is created for a number of visible objects in the simulation not blocked by the number of objects that has been identified as blocking the portion of the field of view for the each aircraft in the number of aircraft. The simulation data is sent to the each aircraft in the number of aircraft.

In yet another advantageous embodiment, an apparatus comprises a network interface configured to communicate with a number of platforms and a computer system. The computer system is configured to identify a position for each platform in the number of platforms for which objects that block fields of view are to be identified to form a number of positions for the number of platforms. The computer system is configured to identify any object in a simulation that blocks a portion of a field of view for the each platform in the number of platforms at the position for the each platform in the number of positions for the number of platforms to form a number of objects. The computer system is configured to create simulation data for a number of visible objects in the simulation not blocked by the number of objects that has been identified as blocking the portion of the field of view for the each platform in the number of platforms. The computer system is configured to send the simulation data to the each platform in the number of platforms.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 15 is an illustration of a flowchart of a process for generating objects that block fields of view in a simulation during training with aircraft in accordance with an advantageous embodiment.

DETAILED DESCRIPTION

Figure 1:
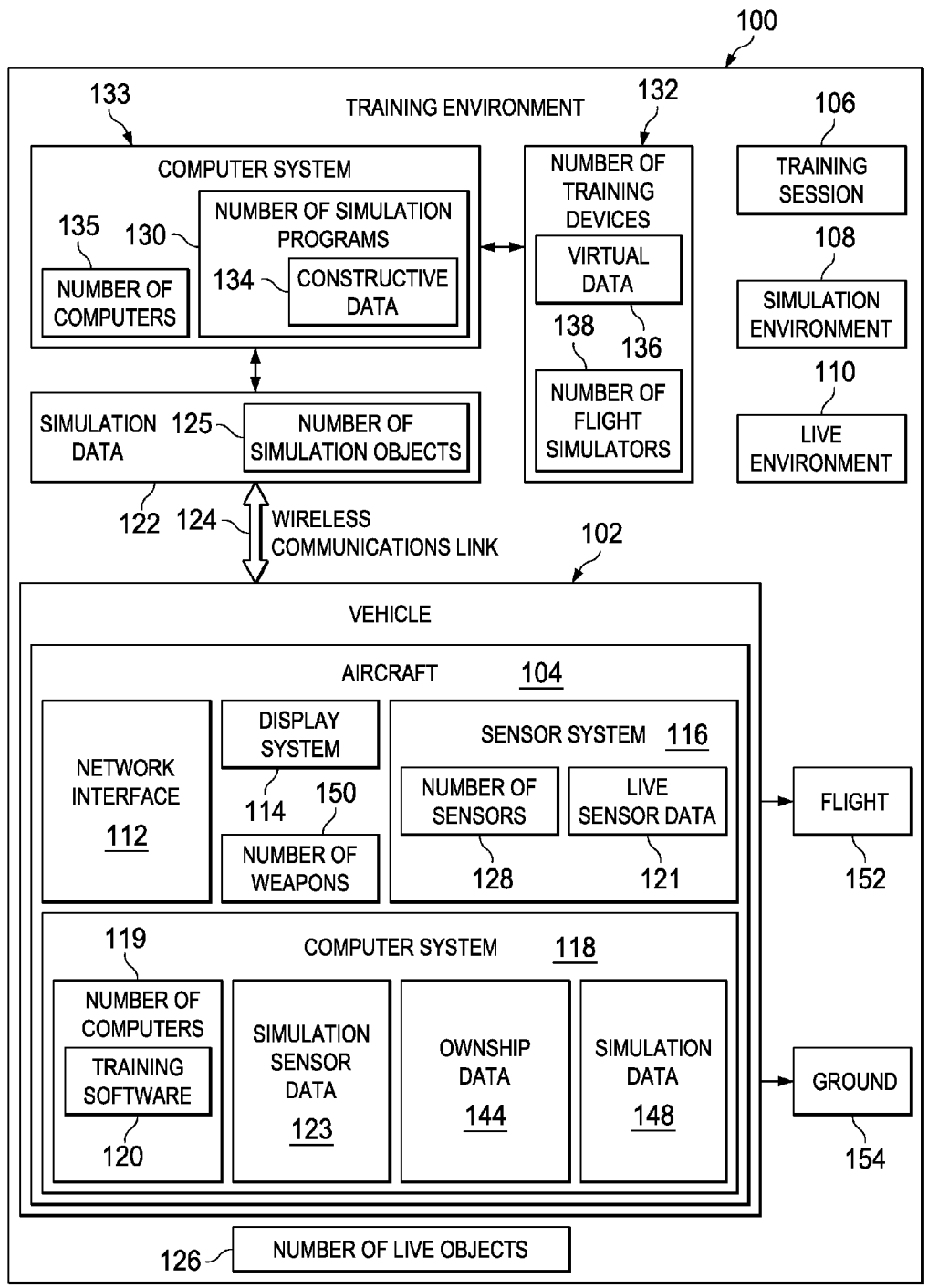
FIG. 1 is an illustration of a block diagram of a training environment in accordance with an advantageous embodiment.

The different advantageous embodiments recognize and take into account a number of considerations. For example, the different advantageous embodiments recognize and take into account that one manner in which training may be performed to reduce the expense and cost involves attaching pods or associating systems with the aircraft that simulate live platforms. These pods may include the hardware and software to simulate the platforms that the pilot may target or interact with.

This type of training simulates weapons that allow aircraft to target live platforms with onboard sensors. These pods also allow weapons to be shot through simulations embedded in the pods. The different advantageous embodiments recognize and take into account that this current type of simulation uses actual hardware or hardware emulations. A hardware emulation is hardware that takes a different form or type from the hardware actually used. A hardware emulation is configured to provide the same response or output as the actual hardware that is being emulated.

Although these types of systems may be useful, the different advantageous embodiments recognize and take into account that the hardware used for this type of simulation may have an undesired level of expense and maintenance.

Thus, the different advantageous embodiments provide a method and apparatus for integrating both live and simulation environments on an aircraft. The different advantageous embodiments provide a pilot and other crew members the capability to train in an actual training environment. This training environment includes both live and simulation objects. Data for the simulation objects is transmitted from other vehicles in the air or on the ground. In one advantageous embodiment, an apparatus comprises an aircraft, a network interface, a display system, a sensor system, and a computer system.

The network interface is configured to exchange data with a number of remote locations using a wireless communications link. The computer system is configured to run a number of processes to receive simulation data received through the network interface over the wireless communications link. The computer system is also configured to run a number of processes to receive live data from the sensor system. The computer system is configured to run a number of processes to present the simulation data with the live data on the display system in the aircraft.

In the different illustrative examples, the simulation data received from the network interface is processed to generate simulation sensor data. This simulation sensor data has the same format as sensor data generated by the sensor system associated with the aircraft. The simulation sensor data is processed by a number of processes running on the computer system to generate the sensor data. In these examples, the processes may take the form of a number of models for the different sensors in the sensor system. Some or all of the sensors may be modeled in these examples.

The sensor data generated by the models may be referred to as simulation sensor data. The sensor data generated by the sensor system may be referred to as live sensor data. The live sensor data and the simulation sensor data are presented together during the training session.

The different advantageous embodiments also recognize and take into account that using live aircraft in a simulated environment may require a simulation of objects that may block a view of a sensor system for the aircraft. For example, mountains, ridges, and other terrain may block part of the view of a radar system for an aircraft. Another example may include objects, such as aircraft, that may block the view of other aircraft from the sensor system of the aircraft in the simulation.

The different advantageous embodiments recognize and take into account that these types of objects may be simulated in processes on the aircraft. The different advantageous embodiments, however, recognize and take into account that this type of simulation of objects may require more processing of resources than desired in an aircraft.

Thus, the different advantageous embodiments provide a method and apparatus for generating visible objects not blocked by objects that block fields of view in a simulation during training with aircraft. In one advantageous embodiment, a position is identified for each aircraft in a number of aircraft for which the objects that block the fields of view are to be identified to form a number of positions for the number of aircraft.

The process identifies any object in the simulation that blocks a portion of a field of view for each aircraft in the number of aircraft at the position for each aircraft in the number of positions for the number of aircraft. Simulation data is created for a number of visible objects not blocked by the number of objects in the simulation that has been identified as blocking the portion of the field of view for each aircraft in the number of aircraft. The simulation data is then sent to each aircraft in the number of aircraft.

With reference now to FIG. 1, an illustration of a block diagram of a training environment is depicted in accordance with an advantageous embodiment. In this illustrative example, training environment 100 includes vehicle 102. Vehicle 102 takes the form of aircraft 104 in these depicted examples. Aircraft 104 is a real or physical aircraft in these examples. In other words, aircraft 104 is not a simulated aircraft that is generated through a computer simulation. Training session 106 may be performed using aircraft 104, in which simulation environment 108 and live environment 110 are both present in training environment 100.

In this illustrative example, network interface 112, display system 114, sensor system 116, and computer system 118 are associated with aircraft 104. A first component may be considered to be associated with a second component by being secured to the second component, bonded to the second component, fastened to the second component, and/or connected to the second component in some other suitable manner. The first component also may be connected to the second component by using a third component. The first component also may be considered to be associated with the second component by being formed as part of and/or an extension of the second component.

Computer system 118 comprises number of computers 119 in this illustrative example. Number of computers 119 may be in communication with each other using wired or wireless communications links in these illustrative examples. Training software 120 runs on number of computers 119 in these illustrative examples. Sensor system 116 generates live sensor data 121. Simulation data 122 is received by network interface 112 over wireless communications link 124.

In these illustrative examples, simulation data 122 may be for number of simulation objects 125. In these illustrative examples, a simulation object is an object created by a computer program or an object represented by a training device. In other words, a simulation object is not a physical object in these examples.

In these illustrative examples, live sensor data 121 is data generated by sensor system 116 associated with aircraft 104 detecting number of live objects 126 in training environment 100. A live object, as used in these illustrative examples, is a physical or real object. In other words, a live object can be seen, touched, and/or handled. For example, when the live object is an aircraft, the live object is the actual aircraft and not a computer representation of the aircraft or a training device for the aircraft. As used herein, a number of, where referring to items, means one or more items. For example, number of live objects 126 is one or more live objects. In these illustrative examples, number of live objects 126 is detected by number of sensors 128 within sensor system 116.

In these illustrative examples, computer system 118 is configured to run training software 120 during training session 106 using aircraft 104 in these examples. Computer system 118 is configured to run training software 120 in a manner that presents live sensor data 121 and simulation data 122 together on display system 114. In these illustrative examples, training software 120 generates simulation sensor data 123 using simulation data 122 in presenting simulation sensor data 123. As a result, simulation sensor data 123 and live sensor data 121 may be processed to generate information about objects that are live and simulated. In other words, live sensor data 121 may be used to generate information about live objects. Simulation sensor data 123 may be used to generate information about objects that are only simulated and not physically present.

In these illustrative examples, simulation data 122 is data generated by a program running on a computer system or by a training device. For example, training environment 100 also may include at least one of number of simulation programs 130, number of training devices 132, and other suitable systems configured to generate simulation data 122.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In these examples, number of simulation programs 130 runs on computer system 133. Computer system 133 comprises number of computers 135. In these illustrative examples, number of simulation programs 130 generates simulation data 122 in the form of constructive data 134.

Number of simulation programs 130 also includes a capability to identify objects that may block a field of view of aircraft 104 and visible objects not blocked by these objects blocking the field of view of aircraft 104. These objects may include, for example, without limitation, terrain, a building, a tree, a ridge, a mountain, another aircraft, and/or other suitable types of objects. The field of view, in these examples, is for a sensor system in aircraft 104. In particular, these objects may be used to generate simulation sensor data 123 to provide information about objects that are simulated in number of simulation programs 130.

The identification of visible objects that are not blocked by objects that block the field of view of aircraft 104 is performed in number of simulation programs 130 on computer system 133 instead of in computer system 118 on aircraft 104. By performing the identification of objects in computer system 133 using number of simulation programs 130, the different illustrative examples reduce the amount of processing resources needed on aircraft 104 to participate in training in training environment 100.

In these illustrative examples, number of simulation programs 130 may identify objects for any vehicle in training environment 100 in addition to aircraft 104. For example, objects may be identified for other physical aircraft. Further, objects also may be identified for number of training devices 132.

Constructive data 134 is data generated by a software program to simulate an object. The object may be, for example, without limitation, an aircraft, a ground vehicle, a missile site, a missile, or some other suitable object.

Number of training devices 132 generates virtual data 136 in simulation data 122. Virtual data 136 is any data generated through the use of number of training devices 132. Number of training devices 132 is any device that may be operated by a human operator. In these illustrative examples, number of training devices 132 may take the form of number of flight simulators 138. In this example, number of flight simulators 138 may be used to generate number of simulation objects 125. Number of simulation objects 125 may be fighter aircraft, transport aircraft, or other suitable types of aircraft in these examples.

In these illustrative examples, number of training devices 132 is in communication with computer system 133. Number of training devices 132 sends virtual data 136 to computer system 133. Computer system 133 takes constructive data 134 and virtual data 136 and sends this data as simulation data 122 to computer system 118 in aircraft 104.

Simulation data 122 may include information about simulation objects. For example, simulation data 122 may include information identifying a location of a simulation object, a heading of a simulation object, an identification of a simulation object, and other suitable information.

In these illustrative examples, computer system 118 also may generate ownship data 144. Ownship data 144 is an example of simulation data 148 that may be generated by computer system 118. Ownship data 144 is data describing aircraft 104. Ownship data 144 is sent to computer system 133 over wireless communications link 124 through network interface 112. Ownship data 144 may include, for example, at least one of a position of aircraft 104, a direction of travel of aircraft 104, a speed of aircraft 104, and other suitable data. Ownship data 144 also may include, for example, data indicating that number of weapons 150 has been fired on aircraft 104. The firing of number of weapons 150 is simulated and not actual firings of number of weapons 150 in this illustrative example. Ownship data 144 includes information about the firing of number of weapons 150.

Computer system 133 receives ownship data 144. Ownship data 144 is used by number of simulation programs 130 and number of training devices 132 to perform training session 106. In these illustrative examples, ownship data 144 is used to represent aircraft 104 as an object in a simulation. Ownship data 144 allows other aircraft, vehicles, and/or objects to interact with aircraft 104 in the simulation. For example, ownship data 144 may be used by number of simulation programs 130 and number of training devices 132 to identify a location of aircraft 104.

This information may be used to determine how number of simulation objects 125 in the simulation interacts with aircraft 104. In other words, ownship data 144 may be used to generate a simulation object for aircraft 104 that can be used within number of simulation programs 130 and/or by number of training devices 132. As one illustrative example, ownship data 144 may be used to identify visible objects within the field of view of sensors in aircraft 104.

In these illustrative examples, training session 106 may be performed while aircraft 104 is in flight 152 and/or on ground 154. In some advantageous embodiments, all of training session 106 for a particular exercise may be performed on ground 154. In some advantageous embodiments, some events may occur while aircraft 104 is on ground 154 prior to taking off in flight 152.

The illustration of training environment 100 in FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, additional aircraft, in addition to aircraft 104, may be present in training environment 100 for performing training session 106. In yet other advantageous embodiments, number of training devices 132 may be unnecessary with only number of simulation programs 130 being used.

In these illustrative examples, simulation sensor data 123 may be generated in a location other than computer system 118 in aircraft 104. For example, a portion of training software 120 may run on a computer on the ground and generate the simulation sensor data. Simulation sensor data 123 may be transmitted over wireless communications link 124 to network interface 112 in place of or in addition to simulation data 122.

Figure 2:
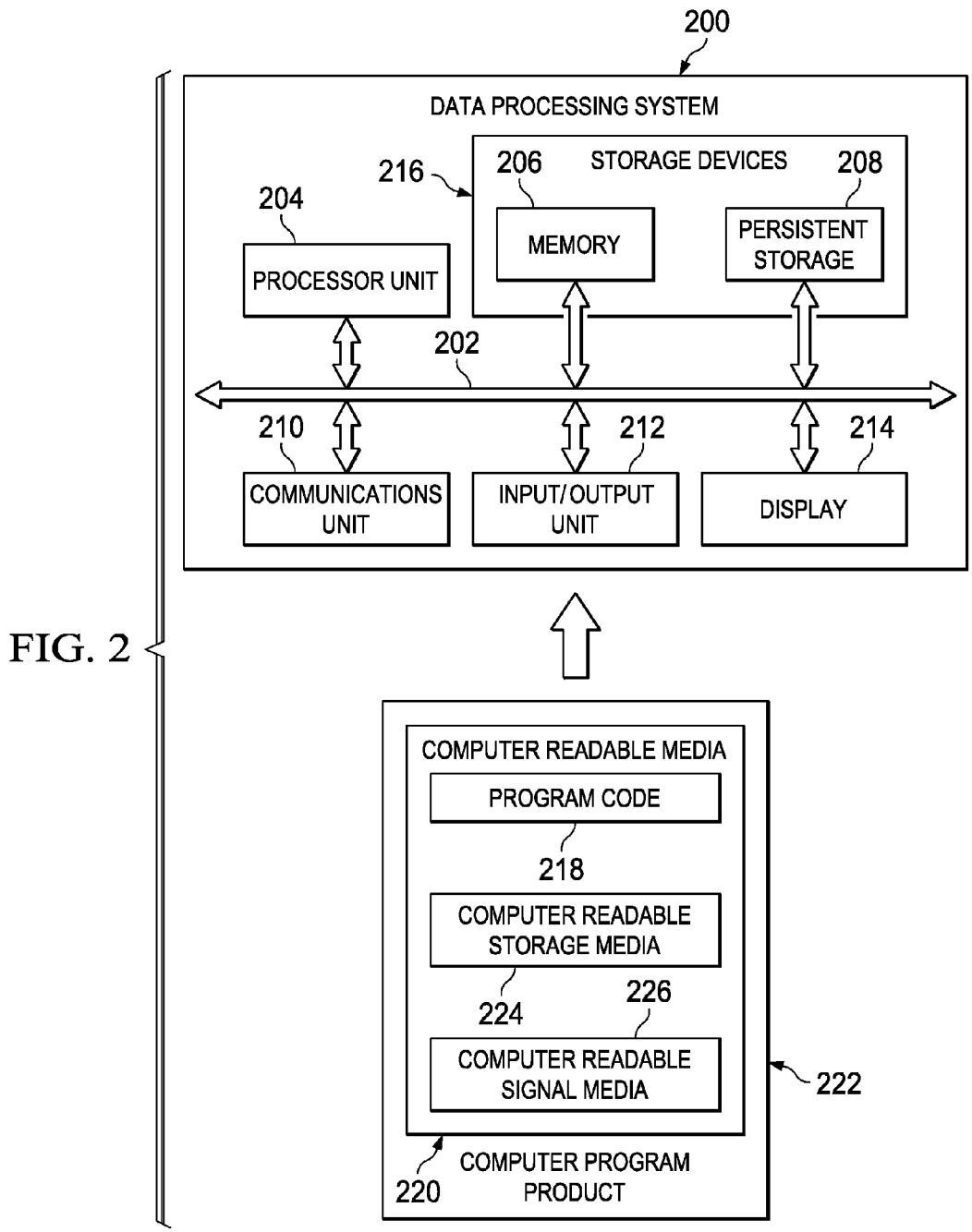
FIG. 2 is an illustration of a data processing system in accordance with an advantageous embodiment.

Turning now to FIG. 2, an illustration of a data processing system is depicted in accordance with an advantageous embodiment. Data processing system 200 is an example of a data processing system that may be used to implement computers, such as number of computers 119 in computer system 118 and number of computers 135 in computer system 133 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226.

Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200.

Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations.

The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
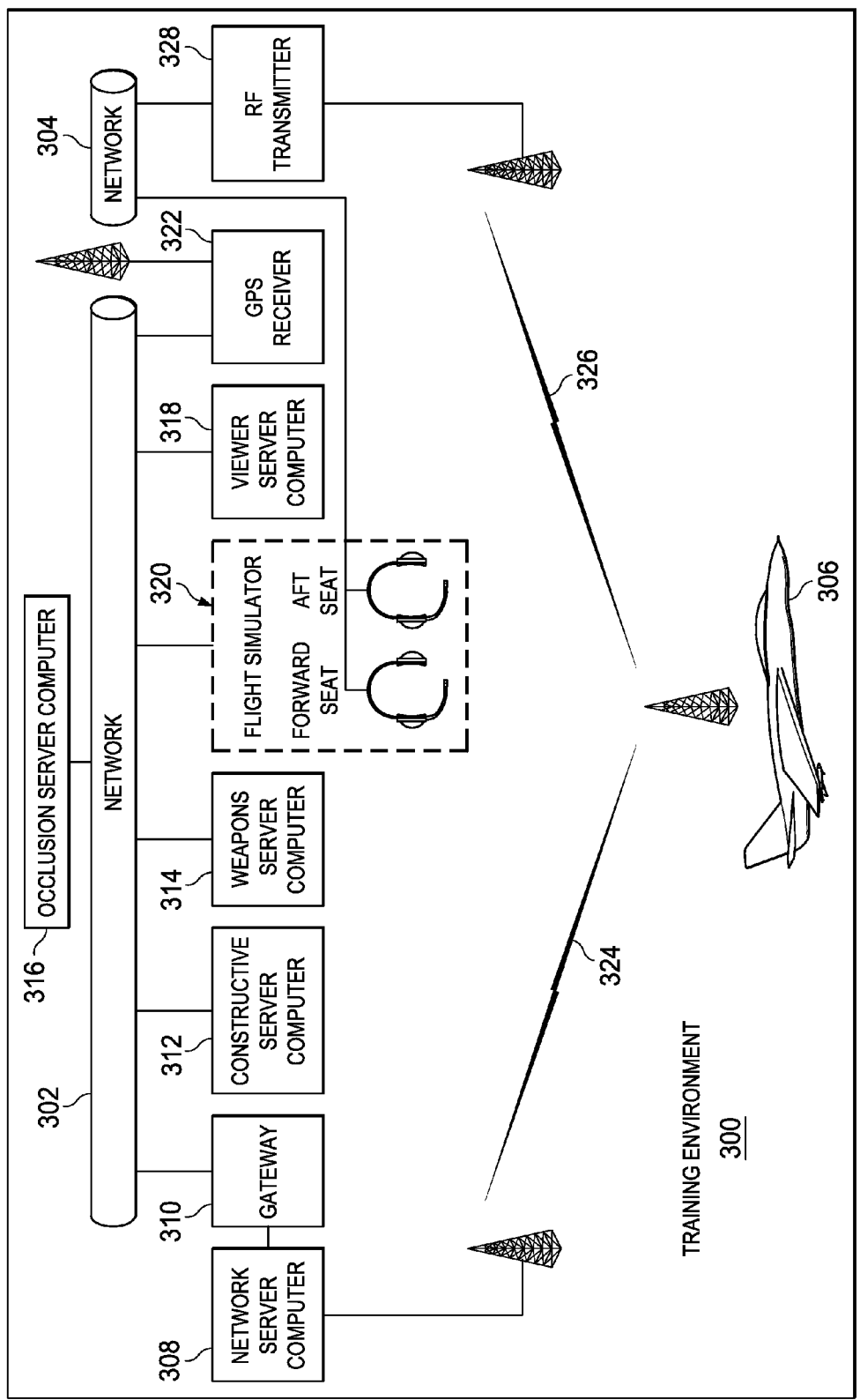
FIG. 3 is an illustration of a training environment in accordance with an advantageous embodiment.

With reference now to FIG. 3, an illustration of a training environment is depicted in accordance with an advantageous embodiment. In this illustrative example, training environment 300 is an example of one implementation for training environment 100 in FIG. 1.

As depicted, training environment 300 includes network 302, network 304, aircraft 306, and network server computer 308. Network 302 includes gateway 310, constructive server computer 312, weapons server computer 314, occlusion server computer 316, viewer server computer 318, flight simulator 320, and global positioning system receiver 322. In these illustrative examples, network server computer 308 exchanges information with aircraft 306. This exchange of information is performed using wireless communications link 324.

Gateway 310 provides a connection between network server computer 308 and other components in network 302.

In other words, all information exchanged between network 302 and network server computer 308 flows through gateway 310.

Constructive server computer 312 runs simulations of different objects. These different objects are simulation objects in these examples. For example, constructive server computer 312 may run simulations of other aircraft for the training involving aircraft 306. As another example, constructive server computer 312 may run simulations to generate simulation objects, such as ground vehicles, ground stations, and other suitable objects.

Weapons server computer 314 runs processes to simulate the firing of weapons by aircraft 306. The firing of weapons by aircraft 306, in these examples, is simulation objects for the actual weapons. Weapons server computer 314 processes any indications of weapons fired by aircraft 306 to determine the direction and location of impact for the weapons.

Weapons server computer 314 simulates the weapon in flight and weapon detonation. Weapons server computer 314 publishes information about weapon type, position, velocity, acceleration, and state on network 302. Additionally, weapons server computer 314 also may determine whether a particular object has been damaged or destroyed.

Occlusion server computer 316 identifies objects that may block a portion of a field of view for any aircraft in training environment 300 and visible objects not blocked by these objects. Occlusion server computer 316 is configured to identify the position of aircraft 306. In this illustrative example, aircraft 306 is an aircraft for which objects that are visible in the field of view for aircraft 306 are to be identified. Occlusion server computer 316 identifies any object in the simulation that is visible in the field of view for aircraft 306.

These objects may take various forms. For example, the objects may be terrain such as, for example, a mountain, a ridge, trees, or other suitable types of terrain. Additionally, these objects may be manmade objects, such as a building, a radio transmission tower, or another suitable object. These objects also may be objects in the air, such as other aircraft.

Occlusion server computer 316 generates simulation data for the number of objects in the simulation that have been identified as visible for aircraft 306. In these illustrative examples, the simulation data is for use by aircraft 306 to indicate what simulated objects are visible. For example, a radar system on the aircraft may not detect another aircraft that may be blocked by an object identified by occlusion server computer 316.

This simulation data is sent to aircraft 306 over a network interface. In these depicted examples, the network interface takes the form of network server computer 308.

Viewer server computer 318 provides a capability to view the training that occurs. For example, viewer server computer 318 may display a map identifying the location of different objects including live and simulation objects. Further, viewer server computer 318 also may display results from weapons fire or other events. Viewer server computer 318 may be used during the training session to view events as they occur. Additionally, viewer server computer 318 may be used to provide a debriefing and analysis of the training session after the training session has completed.

In these illustrative examples, global positioning system receiver 322 is used within training environment 300 to create a common time source. Global positioning system receiver 322 may generate information about time. This common time source may be used by other computers and processes to synchronize the performance of different operations. Global positioning system receiver 322 is used to generate a common timestamp that is the same for the different components in training environment 300.

Flight simulator 320 is a flight simulator that may be used to generate virtual data. The simulations performed using constructive server computer 312 and flight simulator 320 is sent through gateway 310 to network server computer 308. The virtual data and the constructive data form simulation data for use by aircraft 306.

Network server computer 308 sends the virtual data and the constructive data to aircraft 306. Further, any data generated by aircraft 306 is returned through network server computer 308 over wireless communications link 324. This information is then sent to network 302 for use by constructive server computer 312, weapons server computer 314, and flight simulator 320.

In these illustrative examples, voice communications, such as those generated by operators of flight simulator 320 or generated by constructive server computer 312, are sent to network 304. In turn, network 304 sends these communications over radio frequency communications link 326 to aircraft 306 using radio frequency (RF) transmitter 328.

The illustration of training environment 300 in FIG. 3 is not meant to imply physical or architectural limitations to the manner in which different advantageous embodiments may be implemented. This particular illustration is an example of one implementation of the manner in which training environment 100 in FIG. 1 may be implemented. In other advantageous embodiments, different components may be used in addition to or in place of the ones illustrated in these examples.

For example, the functions provided by the different server computers may be integrated into fewer numbers of computers or additional computers. In one example, the functions and processes for all of the different server computers illustrated in training environment 300 may be implemented on a single computer.

Further, flight simulator 320 may be a separate device from the computers running the servers in these examples. Flight simulator 320 may include a full-size replica of the cockpit for an operator.

Additionally, while occlusion server computer 316 generates simulation data for the number of objects in the simulation that have been identified as visible for aircraft 306 in this illustrative example, this simulation data may also be generated for other types of platforms. The platform may be selected from one of a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a manufacturing facility, a building, and/or some other suitable object.

Figure 4:
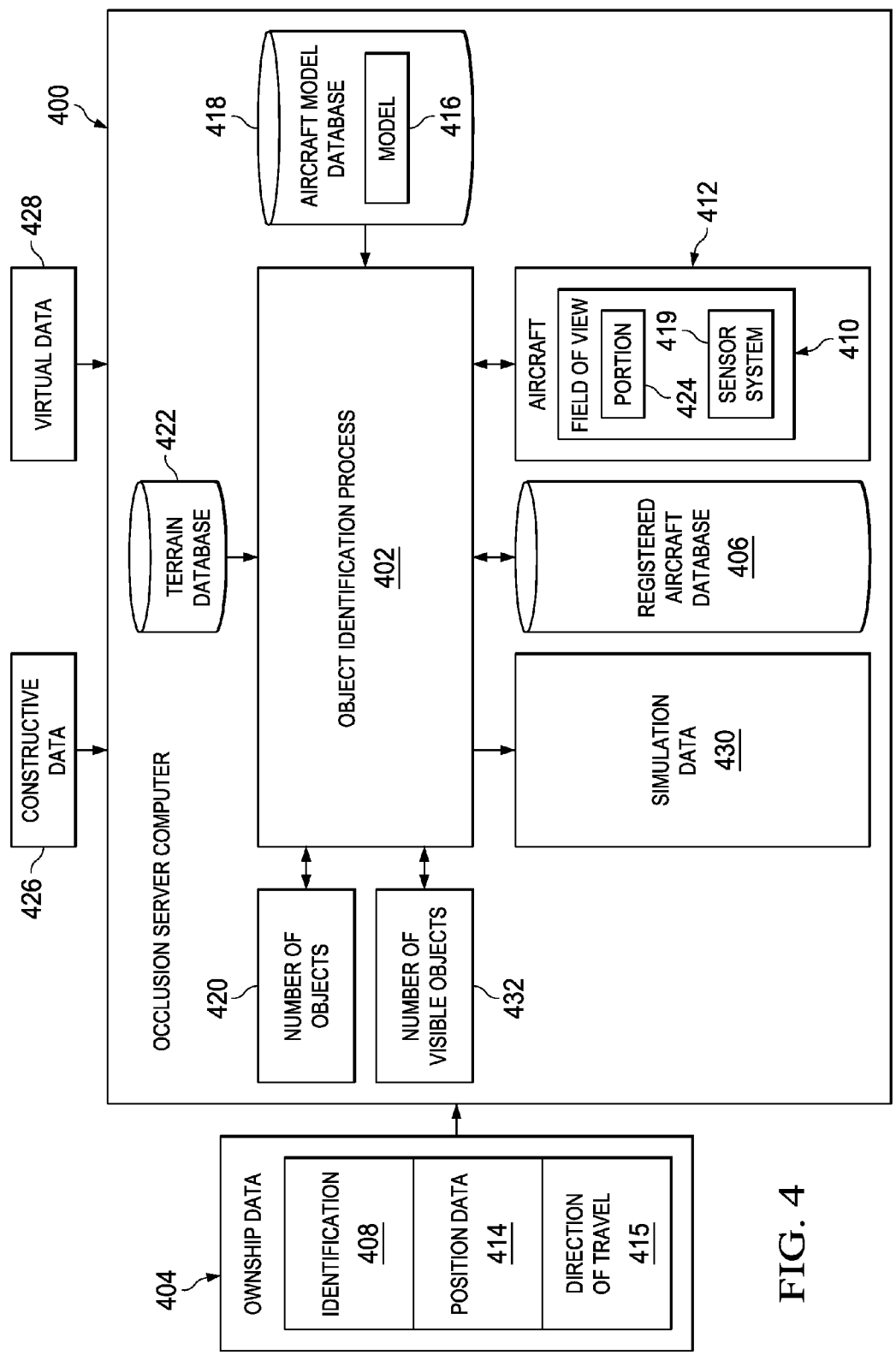
FIG. 4 is an illustration of an occlusion server in accordance with an advantageous embodiment.

With reference now to FIG. 4, an illustration of an occlusion server is depicted in accordance with an advantageous embodiment. In this illustrative example, occlusion server computer 400 is an example of one implementation for occlusion server computer 316 in FIG. 3.

In these illustrative examples, occlusion server computer 400 may be implemented using a data processing system, such as data processing system 200 in FIG. 2. Object identification process 402 runs on occlusion server computer 400. Object identification process 402 may run from a processer unit in occlusion server computer 400 running program code.

In other illustrative examples, object identification process 402 may be embodied in circuits or other hardware in occlusion server computer 400.

As depicted, object identification process 402 monitors for ownship data 404 from aircraft. Ownship data 404 is an example of simulation data that may be generated by an aircraft. In these examples, the aircraft may be, for example, aircraft 104 in FIG. 1 or aircraft 306 in FIG. 3. Ownship data 404 is an example of ownship data 144 in FIG. 1. In these illustrative examples, object identification process 402 monitors for ownship data 404 from aircraft that have registered to receive identifications of visible objects in the field of view for the aircraft.

In this illustrative example, the aircraft may be identified using registered aircraft database 406. Registered aircraft database 406 contains an identification of aircraft for which objects should be identified by object identification process 402.

In these illustrative examples, object identification process 402 monitors ownship data 404 for identification 408. Identification 408 in ownship data 404 is compared with registered aircraft database 406 to determine whether a determination should be made as to whether objects block field of view 410 for aircraft 412. Further, a determination is made as to whether an identification of visible objects in field of view 410 for aircraft 412 should be made.

In these illustrative examples, ownship data 404 also includes position data 414 and direction of travel 415. Position data 414 is information identifying the position of aircraft 412 in three-dimensional space. This position may include, for example, a longitude, a latitude, and an altitude. Additionally, position data 414 also may include an attitude of the aircraft as well as a direction in which the aircraft is pointed.

With position data 414 and direction of travel 415, object identification process 402 identifies field of view 410 for aircraft 412 as identified by identification 408. In these illustrative examples, field of view 410 may be identified for aircraft 412 using model 416 in aircraft model database 418. Model 416 is a model for an aircraft corresponding to aircraft 412 as identified using identification 408 in these illustrative examples.

Model 416 includes information needed to identify the performance of a particular aircraft in different situations. For example, model 416 may identify a number of different parameters for an aircraft. For example, without limitation, these parameters may include a maximum speed, a maximum altitude, fuel consumption, range, weight, turning capabilities, stall speed, sensor systems, and/or other suitable types of parameters.

Field of view 410 is the extent of what can be observed or detected by sensor system 419 for aircraft 412. For example, sensor system 419 may be a radar system in aircraft 412. Field of view 410 may be defined in degrees for azimuth and inclination. Of course, field of view 410 may be defined using any type of coordinate system, depending on the particular embodiment.

Based on position data 414, object identification process 402 locates number of objects 420 that may block a portion of field of view 410. Number of objects 420 may be identified in a number of different ways.

In identifying number of objects 420, object identification process 402 also uses constructive data 426 and virtual data 428. Constructive data 426 is an example of constructive data 134 that may be generated by number of simulation programs 130 in FIG. 1 to simulate different objects.

Virtual data 428 is an example of virtual data 136 generated by number of training devices 132 in FIG. 1. Virtual data 428 may include information identifying objects represented by number of training devices 132 in FIG. 1. These objects may be, for example, aircraft, vehicles, or other combinations of objects.

Further, additional objects that block field of view 410 may be identified using terrain database 422. Terrain database 422 includes identification of objects such as ridges, valleys, mountains, trees, and/or other types of terrain. Objects in terrain database 422 may block portion 424 of field of view 410.

As a result, number of objects 420 and/or the additional objects identified using terrain database 422 may block or occlude portion 424 of field of view 410 for sensor system 419 such that another object located behind number of objects 420 and/or the additional objects may not be seen or detected by sensor system 419. In some cases, the additional objects identified using terrain database 422 may block an object in number of objects 420.

In determining whether number of objects 420 blocks portion 424 of field of view 410 of sensor system 419, model 416 of aircraft 412 may be used to identify the capabilities of sensor system 419. For example, in some illustrative examples, sensor system 419 may be a penetrating radar that may penetrate through trees that are about 50 feet thick. If a vehicle is located within the trees and the depth of the trees is less than 50 feet, then field of view 410 with sensor system 419 may not be blocked. If the vehicle is behind trees that are greater than 50 feet thick, then portion 424 of field of view 410 for sensor system 419 is blocked. In this case, sensor system 419 does not detect the vehicle.

When object identification process 402 identifies portion 424 of field of view 410 that is blocked for sensor system 419, object identification process 402 creates simulation data 430. Simulation data 430 includes number of visible objects 432 not blocked by number of objects 420 and/or the additional objects identified as blocking field of view 410 using terrain database 422.

Number of visible objects 432 includes objects that are visible outside portion 424 of field of view 410. Further, number of visible objects 432 may include objects in number of objects 420 in some cases. For example, objects in number of objects 420 that block portion 424 of field of view 410 may still be visible in field of view 410.

Simulation data 430 is sent on to the network for transmission to the aircraft for which simulation data 430 is generated. Simulation data 430 may be presented to an operator of the aircraft.

The illustration of occlusion server computer 400 in FIG. 4 is not meant to imply physical or architectural limitations to the manner in which different advantageous embodiments may be implemented. Other components, in addition to and/or in place of the ones illustrated, may be used. Some components may be unnecessary in some advantageous embodiments. Also, the blocks are presented to illustrate some functional components. One or more of these blocks may be combined and/or divided into different blocks when implemented in different advantageous embodiments.

In these examples, occlusion server computer 400 is meant as an example of one manner in which occlusion server computer 316 in FIG. 3 may be implemented.

Figure 5:
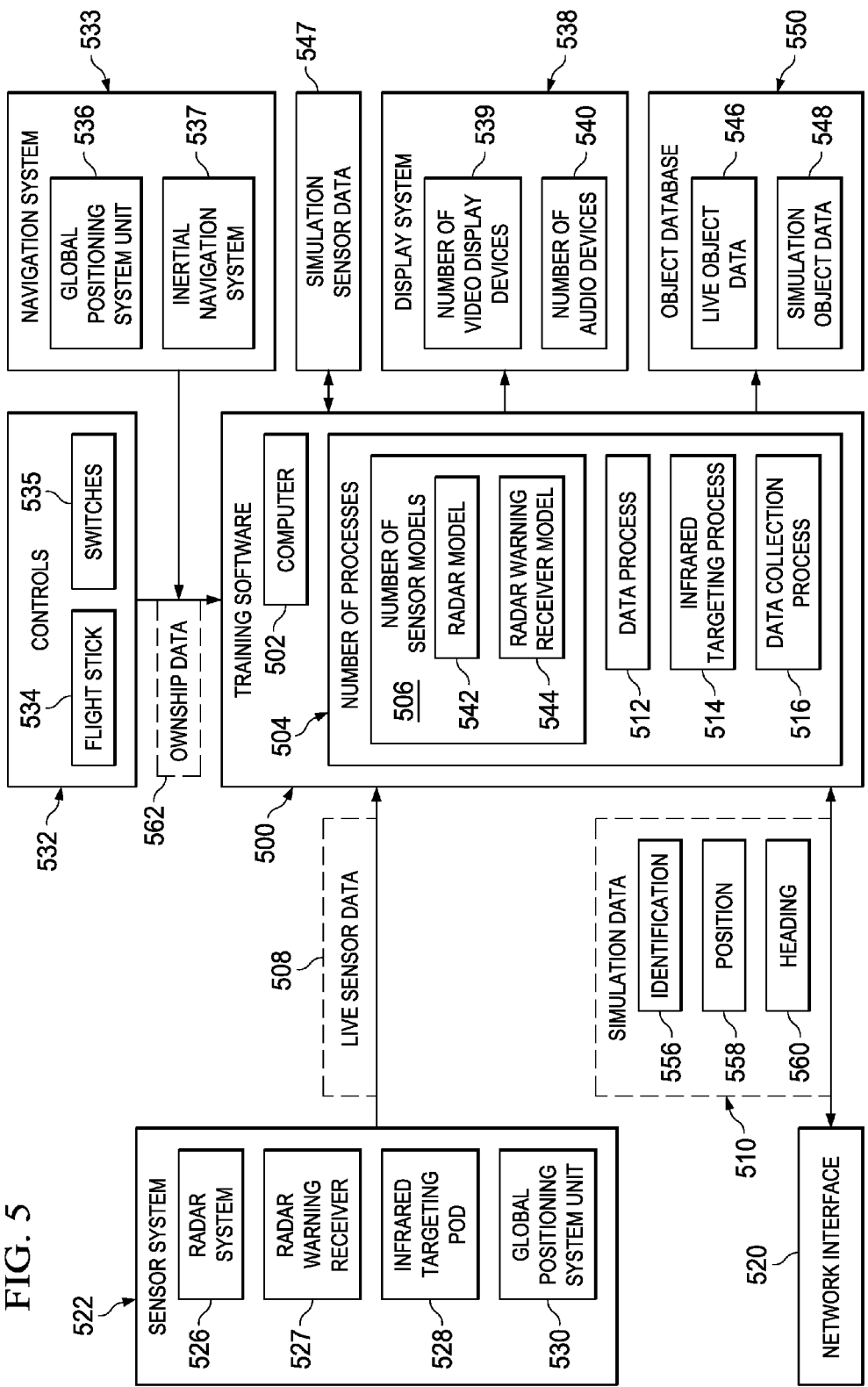
FIG. 5 is an illustration of training software in accordance with an advantageous embodiment.

With reference now to FIG. 5, an illustration of training software is depicted in accordance with an advantageous embodiment. In this illustrative example, training software 500 is an example of one implementation for training software 120 in FIG. 1. As illustrated, training software 500 runs on computer 502 during a training session. In the illustrative examples, training software 500 may be loaded onto computer 502 to run training exercises. Computer 502 may be implemented using data processing system 200 in FIG. 2 and is an example of one implementation for computer system 118 in FIG. 1.

Training software 500 comprises number of processes 504. Number of processes 504 may include number of sensor models 506. As illustrated, number of processes 504 includes data process 512, infrared targeting process 514, and data collection process 516. In these illustrative examples, number of processes 504 may process live sensor data 508 and simulation data 510. Number of processes 504 receives simulation data 510 from network interface 520.

Live sensor data 508 is received from sensor system 522. Sensor system 522, in these illustrative examples, may include at least one of radar system 526, radar warning receiver 527, infrared targeting pod 528, global positioning system unit 530, and other suitable components.

In these illustrative examples, number of processes 504 also may receive ownship data 562 from controls 532 and navigation system 533. As depicted, controls 532 may comprise at least one of flight stick 534, switches 535, and other suitable controls that may be located within the aircraft. Navigation system 533 may include at least one of global positioning system unit 536, inertial navigation system 537, and other suitable types of systems.

In these depicted examples, number of processes 504 combine live sensor data 508 and simulation data 510 for presentation on display system 538. Display system 538 may include, for example, number of video display devices 539 and number of audio devices 540. Display system 538 is the display system used in the aircraft and does not require modifications in the different advantageous embodiments.

Number of sensor models 506 provides models of the physical sensors located in sensor system 522. In these different advantageous embodiments, number of sensor models 506 processes simulation data 510 to generate simulation sensor data 547.

Number of sensor models 506 includes radar model 542 and radar warning receiver model 544. A model, in these illustrative examples, is a process that is designed to simulate a live or physical object. For example, radar model 542 is designed to simulate the operation of radar system 526. Radar warning receiver model 544 is a process designed to simulate the operation of radar warning receiver 527. Radar model 542 and radar warning receiver model 544 generate output that is the same or substantially the same as the output generated by radar system 526 and radar warning receiver 527, respectively.

In this illustrative example, infrared targeting process 514 in number of processes 504 receives live sensor data 508 from infrared targeting pod 528. Additionally, infrared targeting process 514 may receive information about objects in simulation data 510. In this illustrative example, infrared targeting process 514 adds data to live sensor data 508 based on information in simulation data 510.

In this example, the data generated by infrared targeting process 514 also is part of simulation sensor data 547 in these examples. For example, infrared targeting process 514 may add symbols to live sensor data 508 from infrared targeting pod 528 to simulate various objects, such as aircraft, missiles, ground radar, and other objects.

Data process 512 in number of processes 504 receives simulation sensor data 547 and live sensor data 508. In these illustrative examples, data process 512 generates live object data 546 and simulation object data 548. Live object data 546 is information about real or physical objects detected by sensor system 522. Simulation object data 548 also may be generated by infrared targeting process 514 processing live sensor data 508 to create simulation object data 548.

Simulation object data 548 is information generated about simulation objects received in simulation sensor data 547. This information may include, for example, without limitation, an identification of an object, a graphical identifier to use with the object, and other suitable information.

Also, in these different illustrative examples, simulation object data 548 may include identifiers or flags to indicate that the particular object is a simulation object and not a live or physical object. This information may be used to generate graphical indicators such that an operator can determine which objects are live or simulated. In these examples, the graphical indicators may be presented on number of video display devices 539 in display system 538. Live object data 546 and simulation object data 548 form object database 550.

In these illustrative examples, data process 512 generates live object data 546 from live sensor data 508 received from sensor system 522. For example, objects detected by radar system 526 are identified and processed by data process 512. Each identified object forms an object within live object data 546.

In these illustrative examples, simulation data 510 may include identification 556, position 558, and heading 560 for a simulation object. Radar model 542 may use this information as input to generate simulation sensor data 547. In a similar fashion, simulation data 510 may be processed by data process 512 using radar warning receiver model 544 to generate simulation sensor data 547 for the simulation object as being a friend or foe.

In the depicted examples, data process 512 uses live object data 546 and simulation object data 548 in object database 550 as a single presentation on display system 538. In other words, both live objects and simulation objects are presented and interacted with by an operator of the aircraft such that both live sensor data 508 and simulation data 510 are presented together in an integrated presentation.

In these illustrative examples, live object data 546 and simulation object data 548 may be presented on display system 538. This information may be presented on number of video display devices 539 to provide an operator an indication of where different objects may be located relative to the aircraft. Further, number of audio devices 540 also may be used to present live object data 546 and simulation object data 548 from object database 550. In some cases, audio warnings or messages may be presented based on information in object database 550.

Data collection process 516 may receive ownship data 562 from controls 532 and from navigation system 533. For example, data collection process 516 may receive an indication of a firing of a weapon in response to an activation of a control in controls 532. Additionally, data collection process 516 receives position information from global positioning system unit 536 and inertial navigation system 537.

This information is sent back as ownship data 562 to a remote location through network interface 520. Ownship data 562 is used by simulation programs and training devices, such as number of simulation programs 130 and number of training devices 132 in FIG. 1. Ownship data 562 may be used to represent the aircraft as an object within the simulations run by number of simulation programs 130 and number of training devices 132 in FIG. 1.

The illustration of training software 500 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, some processes in number of processes 504 and number of sensor models 506 may run on a different computer, other than computer 502 in the aircraft. In yet other advantageous embodiments, number of sensor models 506 may be unnecessary if simulation data 510 includes simulation object data 548 for use by number of processes 504. Simulation object data 548 may be sent as part of simulation data 510 if sufficient bandwidth is present for use by network interface 520. In other words, the different models for the sensor system in the aircraft may be run in a remote location with that sensor data being sent to computer 502 for processing and presentation.

Object database 550 may be transmitted to a remote location using network interface 520 during the training. In some advantageous embodiments, object database 550 may be downloaded after the flight is completed. Object database 550 may be reviewed to evaluate the training that was performed.

As another example, although the illustrative example shows radar model 542 and radar warning receiver model 544, other models also may be used in addition to or in place of the ones depicted. For example, these models may include an Interrogator Friend or Foe model, a chaff and flair dispenser model, an electronic warfare jamming model, and/or other suitable models.

Figure 6:
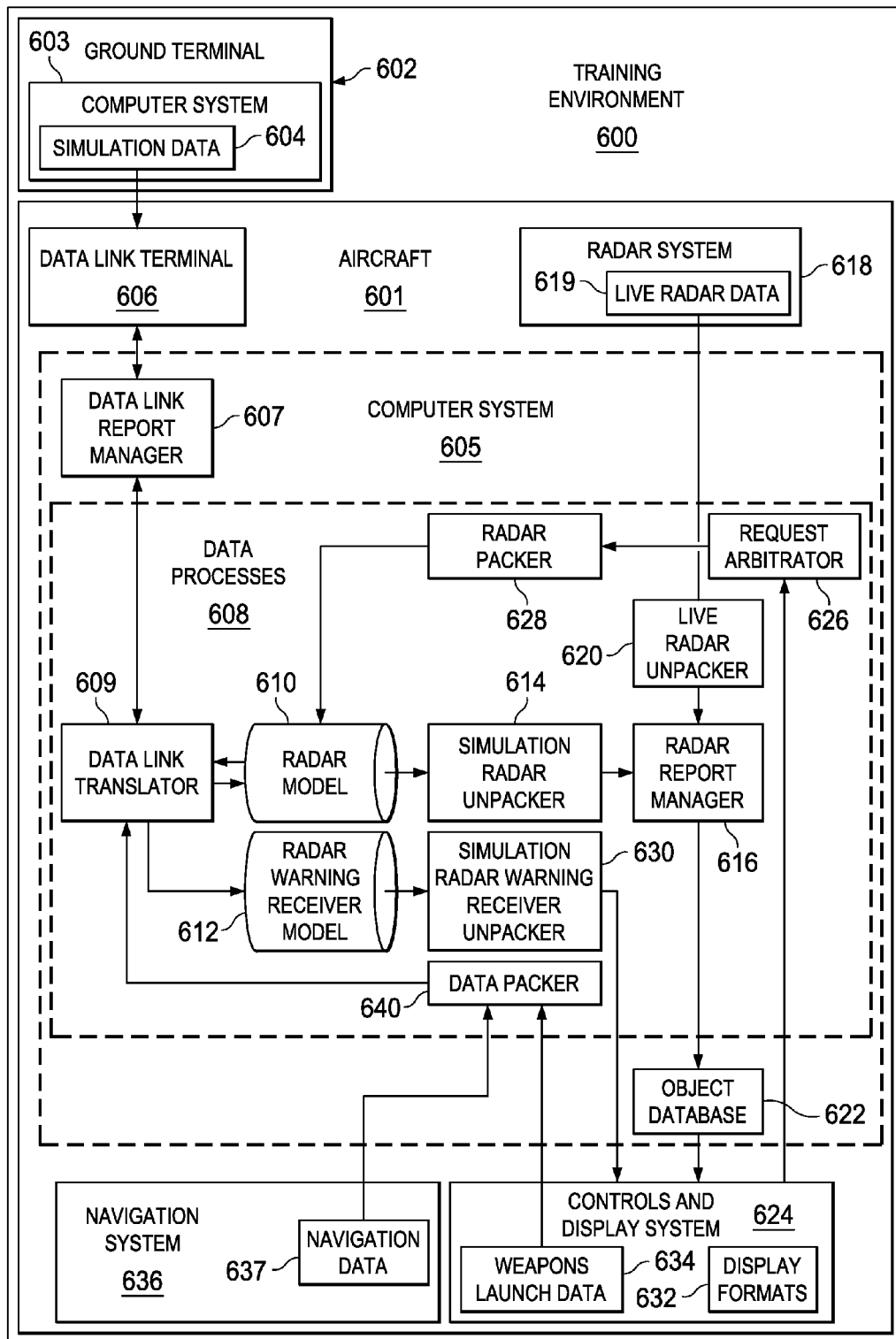
FIG. 6 is an illustration of data flow in a training environment in accordance with an advantageous embodiment.

With reference now to FIG. 6, an illustration of data flow in a training environment is depicted in accordance with an advantageous embodiment. In this illustrative example, training environment 600 is an example of one implementation of training environment 100 in FIG. 1. Further, training environment 600 may be implemented using training software 500 in FIG. 5. The data flow illustrated in this example is for processing simulation data and live data for aerial objects that may be encountered by an aircraft.

As depicted, training environment 600 includes aircraft 601 and ground terminal 602. Ground terminal 602 has computer system 603 for sending simulation data 604 to aircraft 601. Simulation data 604 is sent using a wireless communications link in this illustrative example. Simulation data 604 is received by aircraft 601 using data link terminal 606. Data link terminal 606 may take the form of an avionics device configured to generate and receive different types of data in these examples.

Data at data link terminal 606 is sent to data link report manager 607 running on computer system 605 in aircraft 601. Data link report manager 607 identifies simulation data 604 received from data link terminal 606 and sends simulation data 604 to data processes 608 for processing. In these illustrative examples, data link terminal 606 and data link report manager 607 form a network interface, such as network interface 520 in FIG. 5, between computer system 603 and computer system 605.

Simulation data 604 is sent from data link report manager 607 to data link translator 609. Data link translator 609 is a process in data collection process 516 in FIG. 5 in these illustrative examples. Data link translator 609 separates the simulation data into arrays of simulation data. A portion of these arrays of simulation data is sent into radar model 610, and a portion of these arrays of simulation data is sent into radar warning receiver model 612. The portion of the arrays of simulation data sent into radar model 610 may include information, such as, for example, simulation object information and/or other suitable information. The portion of the arrays of simulation data sent into radar warning receiver model 612 may include information, such as, for example, simulation information about radar emission sources external to aircraft 601.

Radar model 610 generates simulation sensor data. This simulation sensor data is sent to simulation radar unpacker 614. The simulation sensor data may have a format similar to or substantially the same as a format for radar system 618 in aircraft 601. Simulation radar unpacker 614 changes the format of the simulation sensor data into a format for storage in object database 622.

In this illustrative example, radar system 618 generates live radar data 619. Live radar data 619 is sent to live radar unpacker 620 in data processes 608. Live radar unpacker 620 changes the format of live radar data 619 into a format for storage in object database 622. As depicted, both simulation radar unpacker 614 and live radar unpacker 620 send the data with the changed format to radar report manager 616.

Radar report manager 616 identifies simulation object data and live object data for storage in object database 622 and then stores this data in object database 622. Both the simulation object data and the live object data may have substantially the same format in these examples. In some advantageous embodiments, the simulation object data may be associated with an identifier to identify the data as simulation data and not live data.

The data stored in object database 622 may be sent to controls and display system 624. In other words, an operator may control and view the simulation object data and live object data stored using controls and display system 624.

In this depicted example, radar warning receiver model 612 generates simulation sensor data that is sent to simulation radar warning receiver unpacker 630. Simulation radar warning receiver unpacker 630 changes the format of the simulation sensor data and sends the data with the changed format to controls and display system 624. The format of the data is changed such that the data may be controlled and viewed using controls and display system 624.

Controls and display system 624 may be implemented using controls 532 and/or display system 538 in FIG. 5. Further, controls and display system 624 may display the simulation object data and live object data using display formats 632. Display formats 632 may include, for example, without limitation, heads-up display formats, heads-down display formats, and/or other suitable types of formats.

In this illustrative example, an operator may send a request to request arbitrator 626 using controls and display system 624. This request may be, for example, a request to change a component, data, or some other feature of radar model 610. Request arbitrator 626 determines whether the request should be sent to radar model 610. Request arbitrator 626 uses a set of rules and/or a set of priorities for operations performed by radar model 610 to determine whether the request should be sent to radar model 610. As one illustrative example, if a request has a lower priority than an operation being performed by radar model 610, the request is not sent to radar model 610 until the completion of the operation. If the request is sent to radar model 610, request arbitrator 626 sends the request to radar packer 628. Radar packer 628 changes the format of the request into a format that radar model 610 may process.

Data processed using data processes 608 also is sent back to ground terminal 602 from aircraft 601. For example, weapons launch data 634 may be generated using the data presented using controls and display system 624. Weapons launch data 634 is sent to data packer 640. Data packer 640 also receives navigation data 637 generated by navigation system 636.

Data packer 640 changes the format of the data into a format for transmission to computer system 603. The data is sent to data link translator 609 along with simulation sensor data from radar model 610. This data is then sent to data link report manager 607 and then to data link terminal 606. The data is transmitted from data link terminal 606 to computer system 603 in ground terminal 602 using a wireless communications link.

Figure 7:
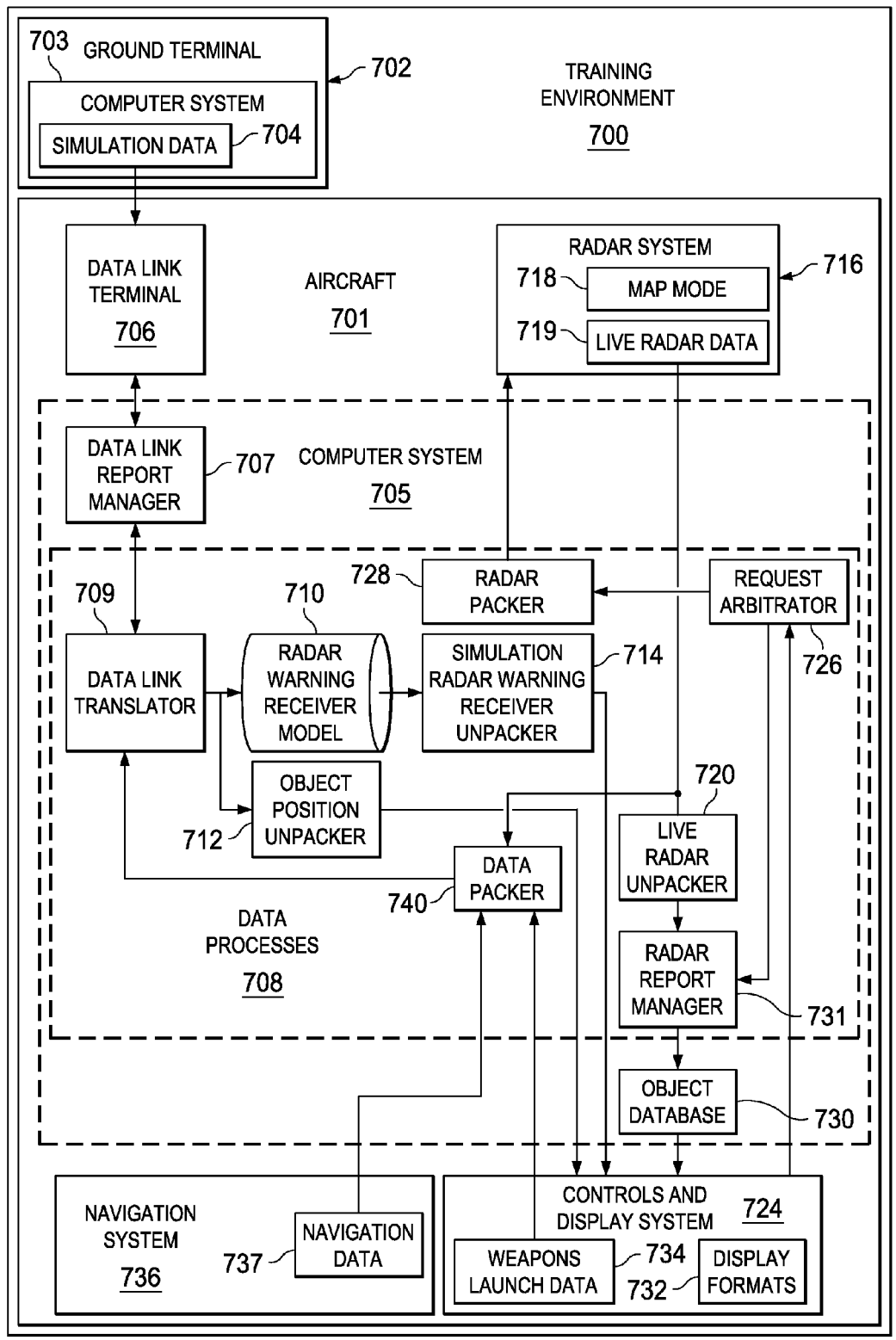
FIG. 7 is an illustration of data flow in a training environment in accordance with an advantageous embodiment.

With reference now to FIG. 7, an illustration of data flow in a training environment is depicted in accordance with an advantageous embodiment. In this illustrative example, training environment 700 is an example of one implementation of training environment 100 in FIG. 1. Further, training environment 700 may be implemented using training software 500 in FIG. 5. The data flow illustrated in this example uses components and processes similar to the data flow illustrated in FIG. 6. However, in this illustrative example, training environment 700 is for processing simulation data and live data for ground-based objects that may be encountered by an aircraft.

As depicted, training environment 700 includes aircraft 701 and ground terminal 702. Ground terminal 702 has computer system 703 for sending simulation data 704 to aircraft 701. Simulation data 704 is sent using a wireless communications link in this illustrative example. Simulation data 704 is received by aircraft 701 using data link terminal 706. Data at data link terminal 706 is sent to data link report manager 707 running on computer system 705 in aircraft 701. Data link report manager 707 identifies simulation data 704 received from data link terminal 706 and sends simulation data 704 to data processes 708 for processing.

Simulation data 704 is sent from data link report manager 707 to data link translator 709. Data link translator 709 separates simulation data 704 into arrays of simulation data. A portion of these arrays of simulation data is sent into radar warning receiver model 710. Another portion of these arrays of simulation data is sent to object position unpacker 712.

The portion of arrays of simulation data sent to object position unpacker 712 contains position data for simulation objects. In this illustrative example, these simulation objects are ground-based objects. Object position unpacker 712 changes the format of the arrays of simulation data such that the position data for the simulation objects may be controlled and viewed using controls and display system 724.

In this depicted example, radar warning receiver model 710 generates simulation sensor data from the arrays of simulation data. The simulation sensor data is sent to simulation radar warning receiver unpacker 714. Simulation radar warning receiver unpacker 714 changes the format of the simulation sensor data and sends the data with the changed format to controls and display system 724. The format of the data is changed such that the data may be controlled and viewed using controls and display system 724.

In this illustrative example, an operator may use the position data for the simulation objects presented in controls and display system 724 to select a simulation object to be monitored using radar system 716. The operator may send a request to request arbitrator 726 based on the selected simulation object. This request may be to change radar system 716 to map mode 718. Map mode 718 allows radar system 716 to monitor a particular area based on the position data for the selected simulation object. In other words, map mode 718 allows radar system 716 to monitor an area for a simulation object without identifying the simulation object or the specific position of the simulation object.

Request arbitrator 726 determines whether this request should be sent to radar system 716. This determination may be based on a set of rules and/or a set of priorities for operations performed by radar system 716. If the request is sent to radar system 716, request arbitrator 726 sends the request to radar packer 728. Radar packer 728 changes the format of the request to a format that may be processed by radar system 716. In this illustrative example, radar packer 728 changes the format of the request to a command that may be executed by radar system 716.

In response to receiving the request with the changed format from radar packer 728, radar system 716 changes to map mode 718 and sends live radar data 719 to live radar unpacker 720. Live radar data 719 is a map of a particular area identified using the position data for the selected simulation object. Live radar unpacker 720 changes the format of live radar data 719 into a format for storage in object database 730. As depicted, live radar unpacker 720 sends the data with the changed format to radar report manager 731.

Further, request arbitrator 726 also sends data included in the request from the operator to radar report manager 731. This data may include information identifying the selected simulation object and/or the position data for the simulation object. Radar report manager 731 identifies simulation object data and live object data for storage in object database 730 and then stores this data in object database 730. In these illustrative examples, simulation object data and the live object data have substantially the same format.

The data stored in object database 730 is sent to controls and display system 724. In other words, an operator may control and view the simulation object data and live object data stored using controls and display system 724.

Controls and display system 724 displays the simulation object data and live object data using display formats 732. Display formats 732 may include, for example, without limitation, heads-up display formats, heads-down display formats, and/or other suitable types of formats.

Data processed using data processes 708 also is sent back to ground terminal 702 from aircraft 701. For example, weapons launch data 734 may be generated using the data presented using controls and display system 724. Weapons launch data 734 is sent to data packer 740. Data packer 740 also receives navigation data 737 generated by navigation system 736. Further, data packer 740 receives live radar data 719 from radar system 716. Data packer 740 changes the format of all the data received into a format for transmission to computer system 703. The data is sent to data link translator 709. This data is then sent to data link report manager 707 and then to data link terminal 706. The data is transmitted from data link terminal 706 to computer system 703 in ground terminal 702 using a wireless communications link.

Figure 8:
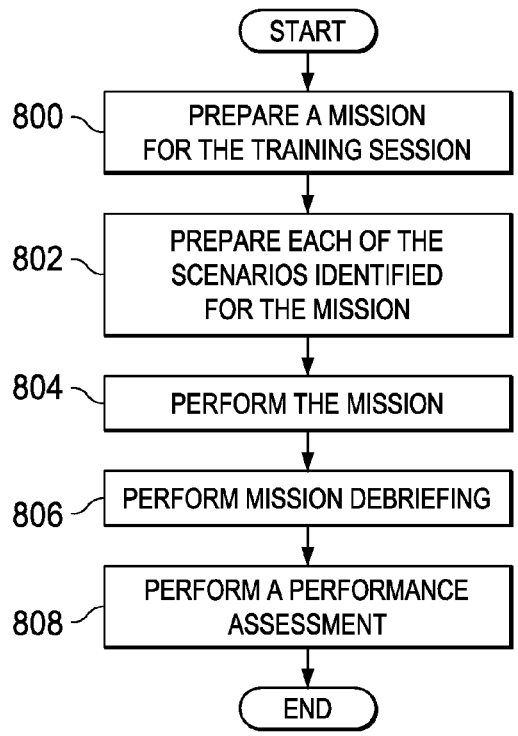
FIG. 8 is an illustration of a flowchart of a process for performing a training session in accordance with an advantageous embodiment.

With reference now to FIG. 8, an illustration of a flowchart of a process for performing a training session is depicted in accordance with an advantageous embodiment. The process illustrated in FIG. 8 may be used to perform training session 106 in training environment 100 in FIG. 1.

The process begins by preparing a mission for the training session (operation 800). In this operation, a mission may be defined to have a number of different scenarios for the training session. These scenarios may include, for example, without limitation, an air-to-air engagement scenario, an air-to-ground strike scenario, a joint-operation scenario including other aircraft, and other suitable scenarios. With one or more of the different advantageous embodiments, multiple scenarios may be performed in a training session that may require more time, airspace, and equipment availability than possible to perform in a single training session or flight.

In this operation, the definition of a training area, the aircraft armament, sensor parameters, behavior, routes, and other information may be set. The process then prepares each of the scenarios identified for the mission (operation 802). This operation includes defining the various parameters and equipment to be used in each scenario in the mission as planned in operation 800. The operation may include identifying both live objects, as well as simulation objects.

The process performs the mission (operation 804). In performing the mission, the data for the different scenarios is loaded onto the computer system for the training environment. Operation 804 may be implemented using training software, such as training software 500 in FIG. 5. The number of live aircraft in the mission may then take off to perform the mission with simulation data being sent to the number of live aircraft. Further, during the flying of the mission, different scenarios may be repeated and rerun until desired results are obtained or until fuel becomes low.

Thereafter, mission debriefing is performed (operation 806). In this operation, information from the mission is presented for review and analysis. For example, the database from the aircraft in the mission, as well as simulation data generated by the computer system, may be viewed. For example, flight paths and events that occurred during the mission may be viewed. Thereafter, a performance assessment is performed (operation 808), with the process terminating thereafter. An assessment of the performance of the crew in the aircraft may be performed based on the results from the mission.

Figure 9:
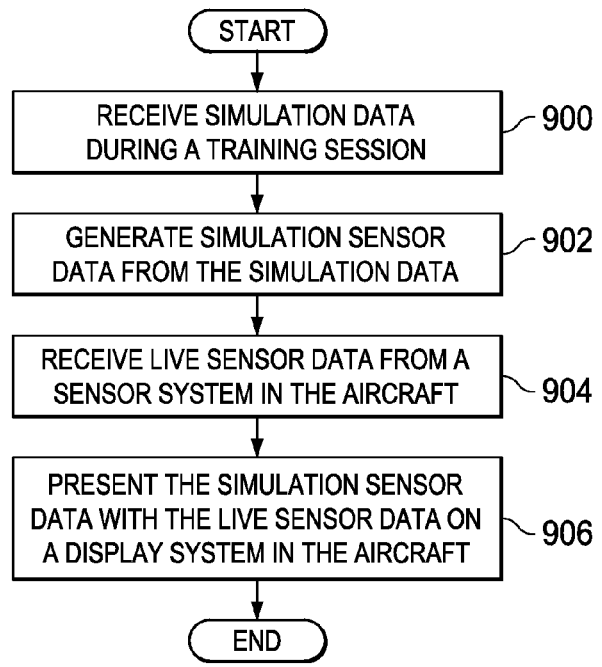
FIG. 9 is an illustration of a flowchart of a process for training in an aircraft in accordance with an advantageous embodiment.

With reference now to FIG. 9, an illustration of a flowchart of a process for training in an aircraft is depicted in accordance with an advantageous embodiment. The process in FIG. 9 may be implemented in a training environment, such as training environment 300 in FIG. 3. In particular, this process may be implemented in a computer system, such as computer system 118 in aircraft 104 in FIG. 1.

The process begins by receiving simulation data during a training session (operation 900). In this illustrative example, the simulation data is received by the training software running on the aircraft. The communications system uses a wireless communications link to receive the simulation data. The process then generates simulation sensor data from the simulation data (operation 902). In these illustrative examples, this process is performed in the aircraft. In other advantageous embodiments, a portion of the training software may operate in another location with the simulation sensor data being transmitted to the aircraft.

The process receives live sensor data from a sensor system in the aircraft (operation 904). The process then presents the simulation sensor data with the live sensor data on a display system in the aircraft (operation 906), with the process terminating thereafter.

Figure 10:
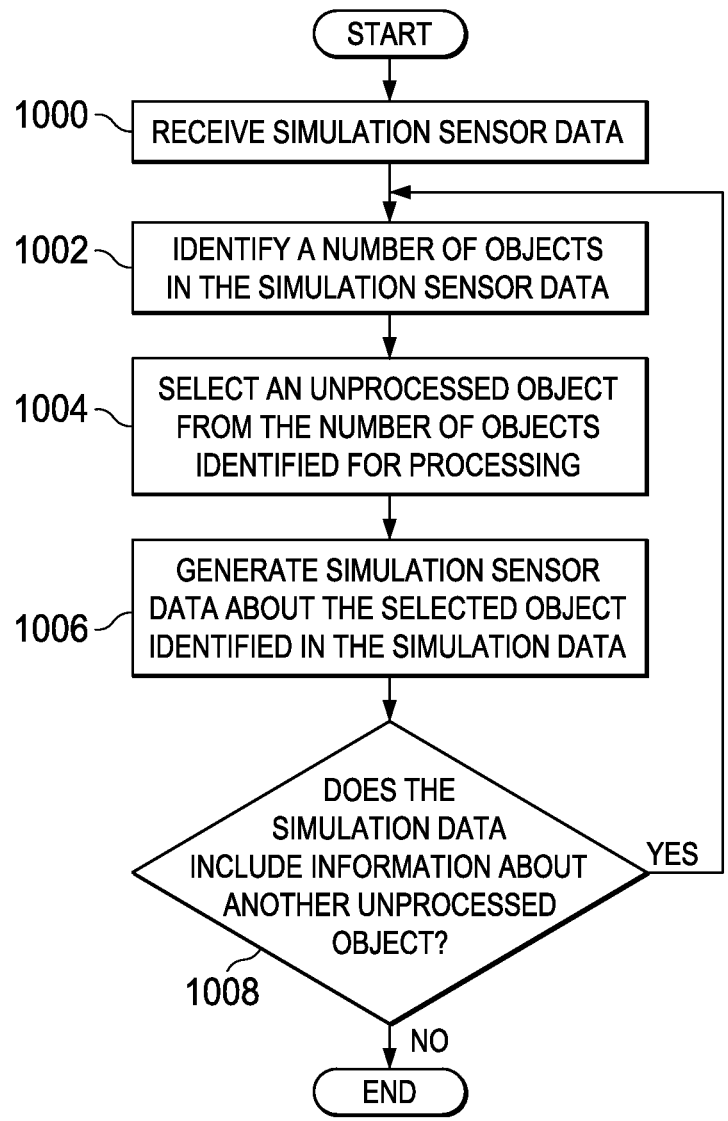
FIG. 10 is an illustration of a flowchart of a process for generating simulation sensor data received in an aircraft in accordance with an advantageous embodiment.

With reference now to FIG. 10, an illustration of a flowchart of a process for generating simulation sensor data received in an aircraft is depicted in accordance with an advantageous embodiment. The process illustrated in FIG. 10 may be implemented in software, such as training software 500 in FIG. 5. The simulation sensor data generated by the operations in this flowchart may be an example of simulation sensor data 547, which may be used to generate simulation object data 548 in FIG. 5.

The process begins by receiving simulation sensor data (operation 1000). The process identifies a number of objects in the simulation sensor data (operation 1002). The process then selects an unprocessed object from the number of objects identified for processing (operation 1004).

Thereafter, the process generates simulation sensor data about the selected object identified in the simulation data (operation 1006). This information may include, for example, without limitation, an identification of the object, a graphical indicator to use for the object, and other suitable information. These objects may be, for example, without limitation, aircraft, vehicles, missile sites, ships, missiles in flight, and other suitable objects.

Operation 1002 may be performed using a model for the sensor system. The model of the sensor system may include models of different sensors in the sensor system. Operation 1006 generates simulation sensor data in the same fashion that an actual sensor system would generate sensor data in an aircraft.

The sensor data is the same format as sensor data generated by physical sensor systems in the aircraft. A determination is then made as to whether the simulation data includes information about another unprocessed object (operation 1008). If the simulation data includes information about another unprocessed object, the unprocessed object is selected, and the process returns to operation 1002. Otherwise, the process terminates. The simulation sensor data may then be processed by the computer system in the aircraft in the same manner as with live sensor data generated by sensors for the aircraft.

Figure 11:
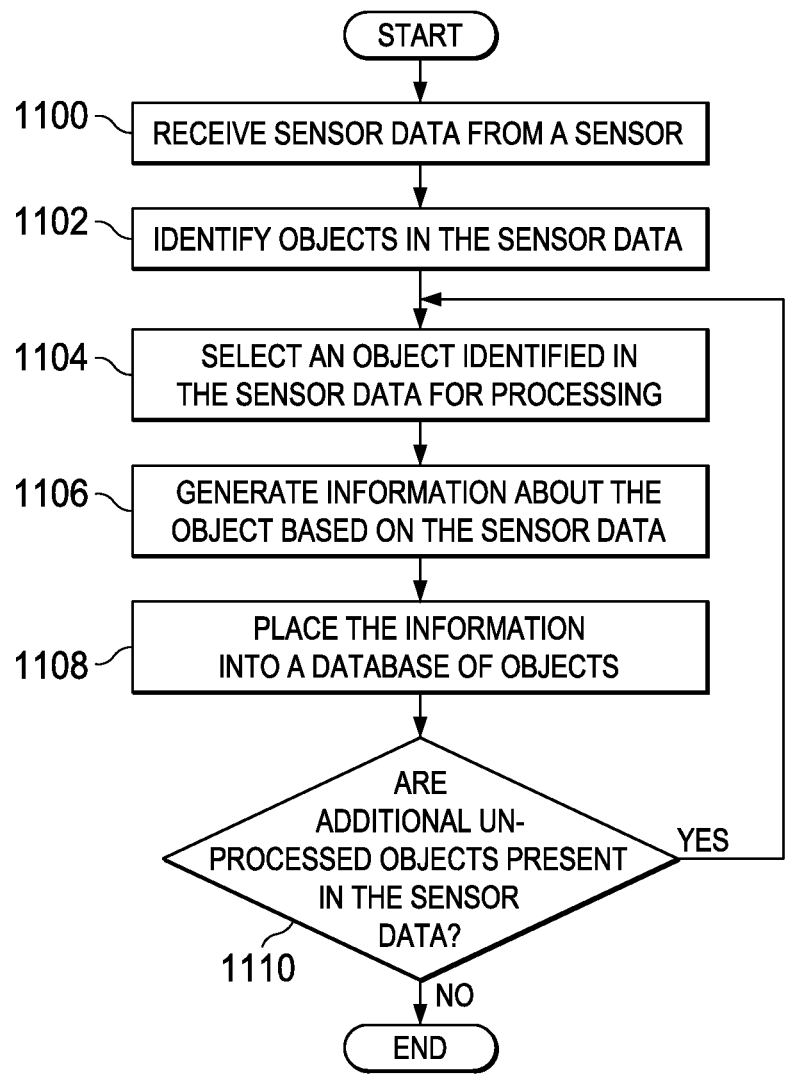
FIG. 11 is an illustration of a flowchart of a process for generating information about objects detected by sensors in accordance with an advantageous embodiment.

With reference now to FIG. 11, an illustration of a flowchart of a process for generating information about objects detected by sensors is depicted in accordance with an advantageous embodiment. The process illustrated in FIG. 11 may be implemented in software, such as training software 500 in FIG. 5. This process may be used to generate information about both live objects and simulation objects in these illustrative examples. The same process may be used, because the simulation sensor data is in the same format and contains the same type of information as the live sensor data generated by physical sensors in the aircraft. The operations illustrated in FIG. 11 may be used to generate data, such as live object data 546 and simulation object data 548 in FIG. 5.

The process begins by receiving sensor data from a sensor (operation 1100). In operation 1100, the sensor data may be either live sensor data or simulation sensor data in these examples. The process then identifies objects in the sensor data (operation 1102). An object identified in the sensor data is selected for processing (operation 1104). Information about the object is generated based on the sensor data (operation 1106). This information may include, for example, an identification of the object, a graphical indicator to use for the object, and other suitable information. Thereafter, the information is placed into a database of objects (operation 1108). Next, a determination is made as to whether additional unprocessed objects are present in the sensor data (operation 1110). If additional unprocessed objects are present, the process returns to operation 1104. Otherwise, the process terminates.

With respect to simulation sensor data that may be received, the information about the object also may include an indication that the object is a simulation object rather than a live object. In some advantageous embodiments, parallel processes may run to process live sensor data and simulation sensor data. One process may process all live sensor data, while the other process processes only simulation sensor data. As a result, all of the objects identified by the process processing simulation sensor data are associated with objects that are simulation objects rather than live objects. The information for each type of object may be stored in separate locations such that an identification of a live object versus a simulation object may be made.

Figure 12:
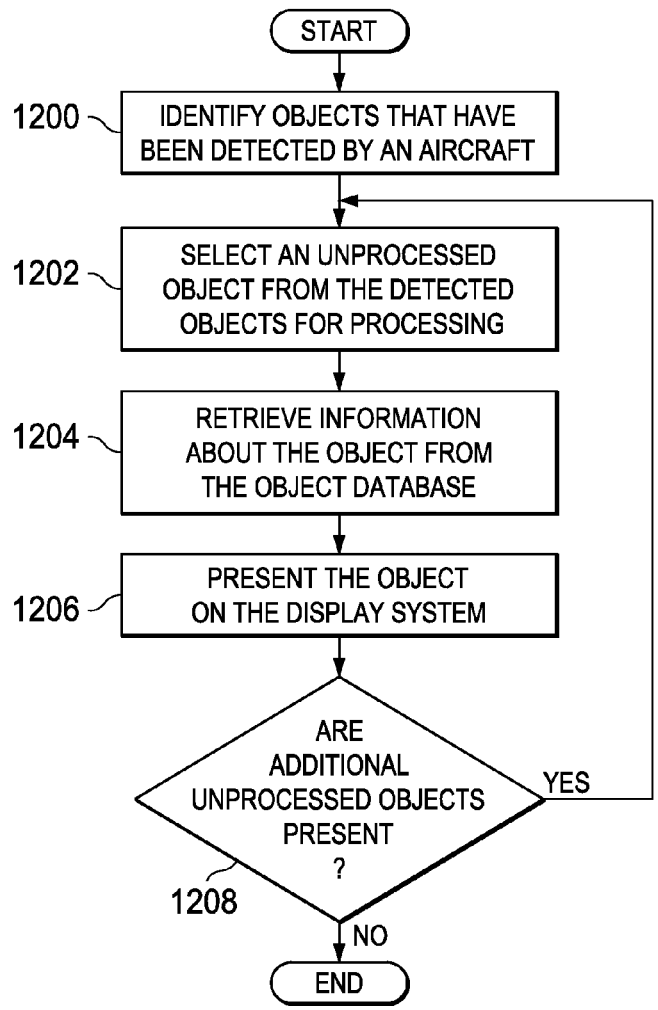
FIG. 12 is an illustration of a flowchart of a process for presenting object information in accordance with an advantageous embodiment.

With reference now to FIG. 12, an illustration of a flowchart of a process for presenting object information is depicted in accordance with an advantageous embodiment. The process illustrated in FIG. 12 may be used to process live object data and simulation object data generated by the process in FIG. 8.

The process begins by identifying objects that have been detected by an aircraft (operation 1200). These objects include ones detected by the sensors in the aircraft and those sent in simulation information to the aircraft. For example, the objects that are sent in the simulation information to the aircraft may be objects that have been identified as being visible in the field of view for the aircraft. The identification may be made using an object database, such as object database 550 in FIG. 5.

Thereafter, the process selects an unprocessed object from the detected objects for processing (operation 1202). The process retrieves information about the object from the object database (operation 1204). This information may include, for example, without limitation, an identification of the object, a location of the object, and other suitable information. The process then presents the object on the display system (operation 1206). For example, a particular type of graphical indicator may be used, depending on the identification of the object type. For example, one type of graphical indicator may be used for friendly aircraft, while another type of graphical indicator may be used for enemy aircraft.

As yet another example, one type of graphical indicator may be used for objects that are blocked in a field of view for an aircraft, while another type of graphical indicator may be used for objects that block a portion of the field of view for the aircraft.

The display of graphical indicators may be presented on display system 538 using number of video display devices 539 in FIG. 5. Additionally, in some cases, the operator or operators in the aircraft may receive audio cues through devices, such as number of audio devices 540 in display system 538 in FIG. 5. In the different advantageous embodiments, these audio cues also may be generated based on the reception of simulation data 510 in FIG. 5.

Next, the process determines whether additional unprocessed objects are present (operation 1208). If additional unprocessed objects are present, the process returns to operation 1202. Otherwise, the process terminates.

In selecting an object for processing in the process in FIG. 12, all objects in the object database are identified and processed. The objects include those for objects actually detected by the aircraft and those sent in the simulation information. In this manner, the presentation of objects, both live and simulated, are presented on the display in the same manner in which live objects are normally presented on the display. Of course, the presentation of the display may include a different indicator for simulation objects as compared to live objects, depending on the particular implementation.

Figure 13:
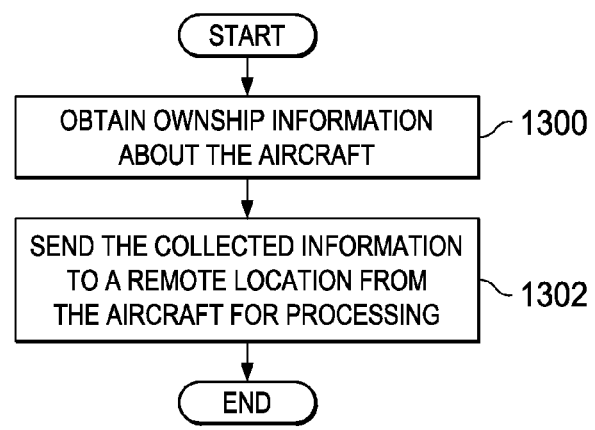
FIG. 13 is an illustration of a flowchart of a process for sending data during a training session in accordance with an advantageous embodiment.

With reference now to FIG. 13, an illustration of a flowchart of a process for sending data during a training session is depicted in accordance with an advantageous embodiment. The process illustrated in FIG. 13 may be implemented in a computer system, such as computer system 118 in aircraft 104 in FIG. 1.

The process begins by obtaining ownship information about the aircraft (operation 1300). This information may be obtained from a system, such as a global positioning system unit and/or an inertial navigation unit. This ownship information may include, for example, a longitude, a latitude, an elevation, an attitude, an altitude, a velocity, and other suitable information.

The ownship information also may include information about whether a control for launching a weapon has been activated. The process then sends the collected information to a remote location from the aircraft for processing (operation 1302), with the process terminating thereafter.

Figure 14:
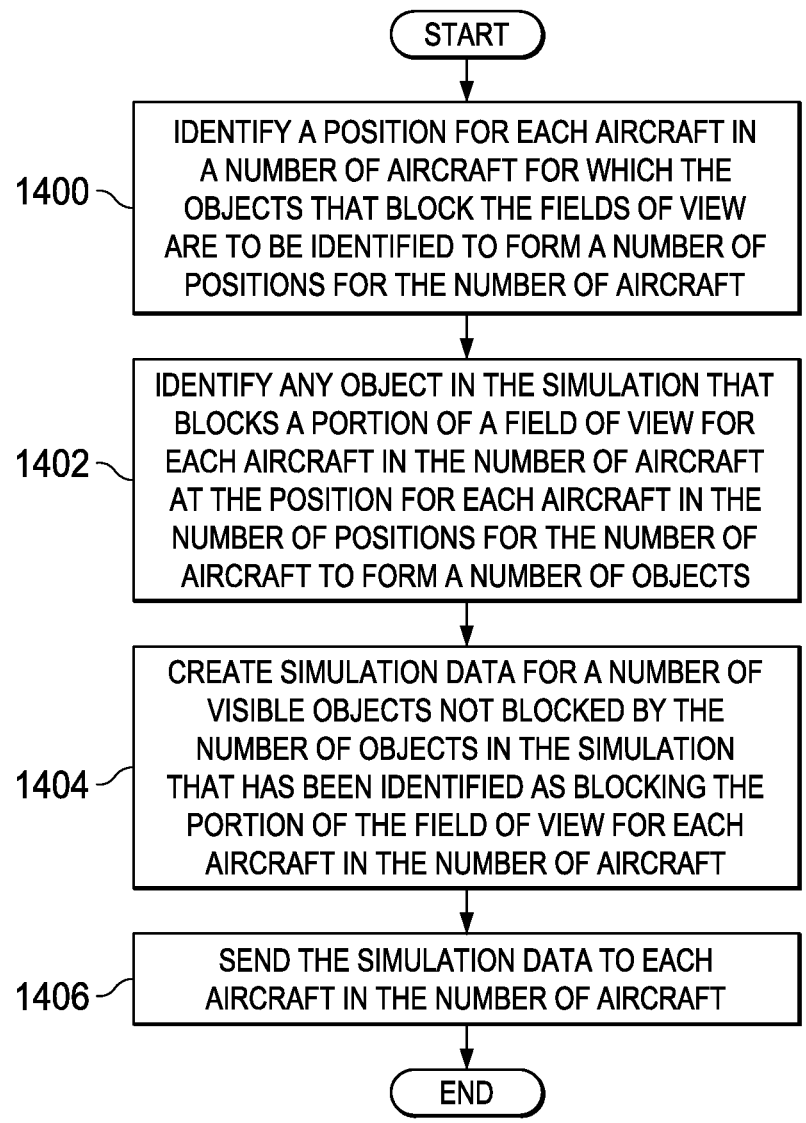
FIG. 14 is an illustration of a flowchart of a process for generating objects that block fields of view in a simulation during training with aircraft in accordance with an advantageous embodiment.

With reference now to FIG. 14, an illustration of a flowchart of a process for generating objects that block fields of view in a simulation during training with aircraft is depicted in accordance with an advantageous embodiment. The process illustrated in FIG. 14 may be implemented using object identification process 402 running on occlusion server computer 400 in FIG. 4.

The process begins by identifying a position for each aircraft in a number of aircraft for which the objects that block the fields of view are to be identified to form a number of positions for the number of aircraft (operation 1400). The field of view is identified using a model of the aircraft, in these illustrative examples. Further, the field of view is for a sensor system in the aircraft.

Thereafter, the process identifies any object in the simulation that blocks a portion of a field of view for each aircraft in the number of aircraft at the position for each aircraft in the number of positions for the number of aircraft to form a number of objects (operation 1402). The objects may be, for example, terrain, a building, a tree, a ridge, a mountain, another aircraft, and/or other suitable types of objects.

The process then creates simulation data for a number of visible objects not blocked by the number of objects in the simulation that has been identified as blocking the portion of the field of view for each aircraft in the number of aircraft (operation 1404). Next, the process sends the simulation data to each aircraft in the number of aircraft (operation 1406), with the process terminating thereafter.

With reference now to FIG. 15, an illustration of a flowchart of a process for generating objects that block fields of view in a simulation during training with aircraft is depicted in accordance with an advantageous embodiment. The process illustrated in FIG. 15 may be implemented using object identification process 402 running on occlusion server computer 400 in FIG. 4.

The process begins by monitoring for ownship data from a number of aircraft (operation 1500). The ownship data includes an identification, position data, and a direction of travel for each aircraft in the number of aircraft.

Thereafter, in response to receiving ownship data from the number of aircraft, the process selects unprocessed ownship data for an aircraft in the number of aircraft (operation 1502). Unprocessed ownship data is ownship data that has not yet been processed by the object identification process. In other words, no operations have been performed using the ownship data.

Next, the process determines whether the identification of the aircraft in the ownship data selected indicates that the aircraft is registered to receive an identification of objects that may block a field of view for the aircraft (operation 1504). Operation 1504 is performed by comparing the identification of the aircraft to a registered aircraft database, such as registered aircraft database 406 in FIG. 4.

If the identification of the aircraft in the ownship data indicates that the aircraft is registered, the process uses a model of the aircraft to identify the field of view for the aircraft (operation 1506). The model may be, for example, model 416 obtained from aircraft model database 418 in FIG. 4.

Thereafter, the process uses a terrain database, constructive data, and/or virtual data to locate objects that may block at least a portion of the field of view for the aircraft (operation 1508). The terrain database may be, for example, terrain database 422 in FIG. 4. The constructive data may be, for example, constructive data 426 in FIG. 4 and/or constructive data 134 in FIG. 1. The virtual data may be, for example, virtual data 428 in FIG. 4 and/or virtual data 136 in FIG. 1.

Next, the process uses the model of the aircraft to identify the capabilities of the sensor system for the aircraft (operation 1510). The process uses the identification of the capabilities of the sensor system to identify which of the objects located block at least a portion of the field of view for the aircraft (operation 1512). In operation 1512, the objects located are the objects located in operation 1508.

For example, in some cases, the sensor system may be a penetrating radar that is capable of penetrating through objects within the field of view up to a certain distance. Objects located within this distance may not be identified as objects blocking the portion of the field of view.

Next, the process identifies a number of visible objects not blocked by the objects that block at least a portion of the field of view for the aircraft (operation 1513). The number of visible objects includes any object visible in the field of view for the aircraft. These visible objects may be identified from the objects identified using the terrain database, the constructive data, and/or the virtual data. These visible objects include objects not seen within the portions of the field of view for the aircraft.

Further, the number of visible objects may include objects identified as blocking the field of view. For example, an object that blocks a portion of a field of view for an aircraft may still be visible to the aircraft even when objects located behind the object may be blocked.

The process adds the number of visible objects identified to simulation data to be sent to the aircraft as identified by the identification in the ownship data selected (operation 1514).

Thereafter, the process determines whether additional unprocessed ownship data is present for an aircraft in the number of aircraft (operation 1516). If unprocessed ownship data is not present, the process sends the simulation data to each aircraft in the number of aircraft (operation 1518). In operation 1518, the simulation data sent to a registered aircraft includes the number of objects identified as blocking the field of view for the aircraft.

The process then returns to operation 1500 as described above. Otherwise, in operation 1516, if unprocessed ownship data is present, the process returns to operation 1502 as described above.

With reference again to operation 1504, if the identification of the aircraft in the ownship data indicates that the aircraft is not registered, the process proceeds to operation 1516 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for training with aircraft. In one advantageous embodiment, an apparatus comprises an aircraft. The apparatus also comprises a communications system, a display system, a sensor system, and a computer system, all of which are associated with the aircraft. The communications system is configured to exchange data with a number of remote locations using a wireless communications link. The computer system is configured to run a number of processes to receive simulation data received through the communications system over the wireless communications link, receive live data from the sensor system associated with the aircraft, and present the simulation data and the live data on the display system.

With one or more of the different advantageous embodiments, training using live aircraft may be reduced in expense and time. For example, with one or more of the different advantageous embodiments, multiple scenarios may be performed during a training session. For example, a first scenario may involve locating a ground target, and a second scenario may involve an air-to-air combat mission. These two scenarios may be performed during one training session more easily than with all live objects. For example, the scheduling and availability of aircraft and ground systems is less of a problem, because simulation objects may be used for one or more of the objects. Additionally, the amount of fuel and maintenance needed may be reduced because of the use of simulation objects in place of live objects.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a network interface that communicates with a platform; and
    a computer system, located remotely from the platform, that:
        generates constructive data;
        receives ownship data from the platform;
        identifies a field of view for the platform, the field of view comprising an extent of what can be detected by a sensor system for the platform;
        identifies a position for the platform;
        identifies, using at least one of: virtual data, and constructive data, in the computer system, any object in a simulation that occludes a portion of the field of view, to form a number of objects;
        creates simulation data for each simulation object in the simulation whose detection by the sensor would not be blocked by the number of objects, to form a number of visible objects, each simulation object comprising at least one of: a virtual object, and a constructive object; and
        sends the simulation data to the platform through the network interface such that processing resources on the platform load simulation object data into an object database on the platform such that the number of visible objects appear on a display system in the platform.

2. The apparatus of claim 1, wherein in identifying the position for each platform, the computer system:
    monitors for information sent from each aircraft, wherein the information includes the position of each aircraft; and
    identifies the position for each platform using the information sent from each aircraft.

3. The apparatus of claim 1, wherein in being configured to identify the any object in the simulation that blocks the portion of the field of view, the computer system:
    identifies the field of view for the platform;
    identifies objects in the simulation; and
    determines whether any object in the objects identified in the simulation blocks the field of view for the platform at the position for the platform based on a heading of the platform.

4. The apparatus of claim 3, wherein the number of visible objects comprises at least one of: the any object in the objects identified blocking the portion of the field of view, and a visible object not in the portion of the field of view.

5. The apparatus of claim 3, wherein in being configured to identify the field of view, the computer system:
    identifies the field of view for the platform using a model of the platform.

6. The apparatus of claim 1, wherein the simulation data comprises an identification of a visible object and a position of the visible object.

7. The apparatus of claim 1, wherein the processing resources on the platform receive the simulation data, process the simulation data using a number of sensor models to formulate simulator sensor data, and process the simulator sensor data to produce simulation object data used to present the number of visible objects with live sensor data on the display.

8. The apparatus of claim 1, wherein the computer system is an occlusion server computer, and the processing resources comprise a radar report manager that receives unpacked live radar data and unpacked simulation data and identifies simulation object data and live object data for storage in the object database and then stores simulation object data and live object data in object database.

9. The apparatus of claim 8 further comprising:
    a network server computer configured to communicate with each aircraft using a wireless communications link; and
    a gateway configured to provide communications between the network server computer and the occlusion server computer.

10. The apparatus of claim 1, wherein the objects comprise at least one of terrain, a building, a tree, a ridge, a mountain, and another platform.

11. The apparatus of claim 1, wherein the computer system includes a ground based server positioned remote from the platform; and
    the processing resources comprise a request arbitrator that receives a request based upon a selected constructive object and the request arbitrator determines whether this request should be sent to radar system based on a set of rules and/or a set of priorities for operations performed by radar system such that when the request has a lower priority than an operation being performed by a radar model on the platform, the request is not sent to the radar model until the completion of the operation.

12. A method for overcoming a limitation in processing resources on a platform that are insufficient to generate a number of visible objects, and indicating simulation sensor data for a constructive object on a display on the platform in a simulation during training, the method comprising:

receiving, in a computer remote from the platform, ownship data from the platform and a position data regarding the platform;

identifying a field of view for the platform, the field of view comprising an extent of what can be detected by a sensor system of the platform;

identifying: a position of the platform based on the ownship data;

identifying, using an object identification process in an occlusion server in the computer remote from the platform, any object in the simulation that occludes a portion of the field of view, to form a number of objects;

creating simulation data, using the occlusion server, for objects in the simulation not blocked by the number of objects, to form the number of visible objects; and sending the simulation data from the server to the platform, such that the processing resources on the platform load simulation object data into an object database on the platform such that the number of visible objects appear on a display system in the platform.

13. The method of claim 12, wherein the step of identifying the position for the platform comprises:

monitoring for information sent from the platform, wherein the information includes the position of the platform.

14. The method of claim 12, wherein the step of identifying the any object in the simulation that blocks the portion of the field of view for the platform comprises:

identifying the field of view for the platform;
identifying objects in the simulation; and
determining whether the any object identified in the simulation occludes the field of view for the platform at the position for the platform based on a heading of the platform.

15. The method of claim 14, wherein the step of creating the simulation data for the number of visible objects comprises:

identifying the number of visible objects from the objects identified in the simulation, wherein the number of visible objects comprises at least one of the any object in the objects identified blocking the portion of the field of view and a visible object not in the portion of the field of view.

16. The method of claim 14, wherein the step of identifying the field of view comprises:

identifying the field of view using a model of the platform; and such that the processing resources unpack live radar data from a map mode of a radar system, and unpack object position data translated from simulation data and unpack translated data from a radar warning receiver model, such that the number of visible objects appear on a display system in the platform.

17. The method of claim 12, wherein the simulation data comprises an identification of a visible object and a position of the visible object.

18. The method of claim 12, wherein a computer system associated with the platform receives the simulation data, generates simulation sensor data using the simulation data, and presents the simulation sensor data with live sensor data on the display system.

19. The method of claim 12, wherein the objects comprise at least one of terrain, a building, a tree, a ridge, a mountain, and another platform.

20. An apparatus comprising:

a network interface that communicates with a number of platforms; and a computer system comprising a ground based occlusion server that:

receives ownship data from each platform in the number of platforms, the ownship data comprising an identification of each platform in the number of platforms and a position data regarding each platform in the number of platforms;

identifies a field of view for each platform in the number of platforms, the field of view comprising an extent of what can be detected by a sensor system for each platform respectively;

identifies a position for each platform in the number of platforms for which objects that occlude fields of view are to be identified, the position based on the ownship data for each platform respectively;

identifies any object in a simulation that occludes a portion of the field of view for any platform in the number of platforms to form a number of objects;

creates simulation data for a number of visible objects in the simulation such that the number of visible objects comprise constructive objects not occluded from the field of view for each platform respectively by the number of objects;

processes the simulation data to create simulation sensor data for each platform respectively; and sends the simulation sensor data to each platform respectively such that each platform receives the respective simulation sensor data such that processing resources on each platform respectively load the simulation sensor data into an object database on the platform such that the number of visible objects appear on a display system in the platform.

21. The apparatus of claim 20, wherein in being configured to identify the position for each platform in the number of platforms for which the objects that block the fields of view are to be identified to form a number of positions for the number of platforms, the computer system is configured to:

monitor for information sent from each platform, wherein the information includes the position of each platform; and identify the position for each platform for which the objects that block the fields of view are to be identified to form the number of positions for the number of platforms using the information sent from each platform.

* * * * *